US008094808B2

(12) United States Patent
Molenda et al.

(10) Patent No.: US 8,094,808 B2
(45) Date of Patent: *Jan. 10, 2012

(54) UNPOWERED TWISTED PAIR LOOPBACK CIRCUIT FOR DIFFERENTIAL MODE SIGNALING

(75) Inventors: James Molenda, Los Gatos, CA (US); Maurilio Tazio De Nicolo, Saratoga, CA (US); Karl Nakamura, San Jose, CA (US); Roger Karam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 547 days.

This patent is subject to a terminal disclaimer.

(21) Appl. No.: 12/264,145

(22) Filed: Nov. 3, 2008

(65) Prior Publication Data

US 2009/0129583 A1    May 21, 2009

Related U.S. Application Data

(63) Continuation of application No. 09/727,111, filed on Nov. 29, 2000, now Pat. No. 7,447,307.

(51) Int. Cl.
*H04M 1/02* (2006.01)
*H03B 1/04* (2006.01)

(52) U.S. Cl. ............. 379/403; 327/67; 327/108; 333/1; 365/130; 367/79; 370/228; 370/229; 370/296; 370/362; 375/150; 375/224; 375/351

(58) Field of Classification Search ............ 327/67, 327/108; 333/1; 365/130; 367/79; 370/224, 370/228, 229, 296, 362; 375/224, 351, 150; 379/27.01, 403; 710/306
See application file for complete search history.

(56) References Cited

U.S. PATENT DOCUMENTS

| 3,982,233 | A | * | 9/1976 | Crookshanks | 365/130 |
|---|---|---|---|---|---|
| 4,131,767 | A | | 12/1978 | Weinstein | |
| 4,161,719 | A | | 7/1979 | Parikh et al. | |
| 4,232,199 | A | | 11/1980 | Boatwright et al. | |
| 4,320,472 | A | * | 3/1982 | Fort | 367/79 |
| 4,397,020 | A | | 8/1983 | Howson | |
| 4,468,784 | A | * | 8/1984 | Jagnow et al. | 375/150 |
| 4,532,626 | A | | 7/1985 | Flores et al. | |
| 4,599,494 | A | | 7/1986 | Welty | |
| 4,626,954 | A | | 12/1986 | Damiano et al. | |
| 4,710,949 | A | | 12/1987 | Ahuja | |
| 4,723,267 | A | | 2/1988 | Jones et al. | |
| 4,827,505 | A | | 5/1989 | Takato et al. | |
| 4,875,223 | A | | 10/1989 | Curtis | |
| 4,969,179 | A | | 11/1990 | Kanare et al. | |
| 5,029,201 | A | | 7/1991 | Bindels | |
| 5,056,131 | A | | 10/1991 | Kanare et al. | |

(Continued)

OTHER PUBLICATIONS

Dove, Daniel, Powerpoint Presentation: Power Over the DTE,: Jan. 2000.

(Continued)

*Primary Examiner* — Gerald Gauthier
(74) *Attorney, Agent, or Firm* — BainwoodHuang

(57) ABSTRACT

A method and apparatus provide an IP telephone or similar device with a mechanism to receive and at least briefly loop back discovery signals received from a telecommunications device such as an Ethernet switch while not permitting the loop back of data packet signals. No mechanical relays are required and the circuitry can be fully integrated on an integrated circuit using commonly available techniques, if desired.

20 Claims, 31 Drawing Sheets

U.S. PATENT DOCUMENTS

| | | | | |
|---|---|---|---|---|
| RE33,900 E | | 4/1992 | Howson | |
| 5,199,049 A | | 3/1993 | Wilson | |
| 5,223,806 A | | 6/1993 | Curtis et al. | |
| 5,249,183 A | * | 9/1993 | Wong et al. | 370/228 |
| 5,311,518 A | | 5/1994 | Takato et al. | |
| 5,321,372 A | | 6/1994 | Smith | |
| 5,327,465 A | * | 7/1994 | Wincn et al. | 375/351 |
| 5,345,447 A | * | 9/1994 | Noel | 370/362 |
| 5,406,260 A | | 4/1995 | Cummings et al. | |
| 5,418,504 A | * | 5/1995 | Nottenburg | 333/1 |
| 5,467,369 A | * | 11/1995 | Vijeh et al. | 375/224 |
| 5,541,957 A | | 7/1996 | Lau | |
| 5,574,748 A | | 11/1996 | Vander Mey et al. | |
| 5,659,542 A | | 8/1997 | Bell et al. | |
| 5,680,555 A | * | 10/1997 | Bodo et al. | 710/306 |
| 5,726,976 A | * | 3/1998 | Thompson et al. | 370/229 |
| 5,796,185 A | | 8/1998 | Takata et al. | |
| 5,799,040 A | | 8/1998 | Lau | |
| 5,802,042 A | | 9/1998 | Natarajan et al. | |
| 5,825,755 A | * | 10/1998 | Thompson et al. | 370/296 |
| 5,994,998 A | | 11/1999 | Fisher et al. | |
| 6,064,422 A | | 5/2000 | Goolcharan et al. | |
| 6,115,468 A | | 9/2000 | De Nicolo | |
| 6,140,911 A | | 10/2000 | Fisher et al. | |
| 6,218,930 B1 | | 4/2001 | Katzenberg et al. | |
| 6,348,817 B2 | * | 2/2002 | Lu et al. | 327/108 |
| 6,614,801 B1 | | 9/2003 | Parnes | |
| 6,650,635 B1 | | 11/2003 | Weinstein et al. | |
| 6,804,351 B1 | | 10/2004 | Karam | |
| 7,447,307 B2 | * | 11/2008 | Molenda et al. | 379/403 |
| 2002/0063584 A1 | * | 5/2002 | Molenda et al. | 327/67 |
| 2009/0129583 A1 | * | 5/2009 | Molenda et al. | 379/403 |

OTHER PUBLICATIONS

Muir, Robert, Powerpoint Presentation: "Update on Diode Discovery Process," May 2000.

* cited by examiner

US 8,094,808 B2

UNPOWERED TWISTED PAIR LOOPBACK CIRCUIT FOR DIFFERENTIAL MODE SIGNALING

CROSS-REFERENCE TO RELATED APPLICATIONS

The present application is a continuation of U.S. patent application Ser. No. 09/727,111, filed Nov. 29, 2000, now U.S. Pat. No. 7,447,307, entitled "Unpowered Twisted Pair Loopback Circuit For Differential Mode Signaling," commonly owned herewith.

FIELD OF THE INVENTION

The present invention relates to a method and an apparatus for detecting the presence of a connected device of a particular class, such as a telephone, that may require phantom power to be supplied over twisted pair wiring. Discovery signals transmitted on ports of a telecommunications device, such as a switch, need to be looped back to the telecommunications device to indicate the presence of the particular connected device (the absence of the particular device being inferred by the absence of the loop back signal). Accordingly, the discovery signal should not be looped back if the device is absent or if a connected device is not of the particular type.

BACKGROUND OF THE INVENTION

Telephones and other types of data terminal equipment (DTE) are routinely used for voice, data traffic and other forms of telecommunication. Such DTE equipment typically is wired with twisted pair wire to a switch or similar telecommunications device. For example, some communications systems utilize an Ethernet switch in communication with Internet Protocol (IP) or voice over IP (VoIP) telephones. Where the IP telephones are compatible and thus adapted to receive phantom power over the twisted pair connection to the switch, it is desirable for the switch to verify the compatibility before applying the phantom power because it is conceivable that the phantom power could damage or operate improperly with certain non-compatible DTE equipment ("legacy equipment") which might also be connected to the switch. In accordance with the invention disclosed in co-pending U.S. patent application Ser. No. 09/710,388 filed Nov. 9, 2000 in the name of inventor Roger Karam and entitled "Method and Apparatus for Detecting a Compatible Phantom Powered Device Using Common Mode Signaling", commonly owned herewith, a method and apparatus which enable discovery of such compatible telephones by a switch or similar device is taught. This application issued on Oct. 12, 2004 as U.S. Pat. No. 6,804,351. In a nutshell, the approach used is to generate a differential mode signal, apply it to center-taps of transformers coupling the switch to the twisted pair wires, apply the differential mode signal received at center-taps of corresponding transformers at the IP telephone to an identity network, loop the signal (possibly modified by the identity network) back to the switch, and, based on the returned signal (and possibly other considerations), apply or not apply phantom power between the center-taps of the switch-side transformers to power the IP telephone. This approach requires that the IP telephone be configured to "loop back" signals received by it to the switch. This is undesirable for data signals under certain circumstances as it can lead to certain kinds of potential computer network problems. Accordingly, it is desirable in such circumstances to permit loop back of discovery signals only and not data signals. In the past, normally closed mechanical relays at the IP telephone coupled with a low pass filter (LPF) to pass only the discovery signals and not the data signals have been used. Such mechanical relays are relatively expensive and can become unreliable. Low pass filters composed of inductors and capacitors also consume volume in the DTE equipment and can be relatively expensive to deploy.

FIG. 1 is an electrical schematic diagram of a telecommunications system in accordance with a prior design. A telecommunications device 10 such as an Ethernet switch includes a port 12 which includes a transmitter 14 and a receiver 16. Transmitter 14 includes a center-tapped transformer winding 18 with differential output on nodes 20, 22 and a center-tap 24. Receiver 16 includes a center-tapped transformer winding 26 with differential input on nodes 28, 30 and a center-tap 32. A phantom power supply 34 provides direct current (DC) phantom power (preferably =+48 volts or less) to center taps 24, 32. A four (or more) wire cable 36 connects telecommunications device 10 to, for example, an IP telephone 38. IP telephone 38 receives a differential signal at nodes 40, 42 of receive transformer 44 which includes center-tapped winding 46. IP telephone 38 transmits a differential signal at nodes 48, 50 of transmit transformer 52 which includes center-tapped winding 54. Center-tap node 56 is the center-tap of winding 46 and center-tap node 58 is the center-tap of winding 54. Phantom power is extracted at nodes 56, 58 and is applied to a power processor 60 at the IP telephone in known ways, such as is taught in U.S. Pat. No. 6,115,468 filed Mar. 26, 1998 entitled "Power Feed For Ethernet Telephones Via Ethernet Link" and commonly owned herewith. A first relay 62 couples differential output lines 64, 66 when unenergized to low pass filter network 68. A second relay 70 couples the differential outputs 72, 74 of LPF 68 to differential input lines 76, 78 of winding 80 of transformer 52. In this way, while relays 62, 70 are not energized (as is the case when phantom power is not applied), signals loop through IP telephone 38 but they are subjected to LPF 68 which filters out the higher frequency data signals while allowing the lower frequency discovery signals to pass.

When relays 62, 70 are energized (e.g., when phantom power supply 34 for port 12 is turned on or another condition controlling relays 62, 70 is met) then the receive signals from differential output lines 64, 66 of winding 82 of transformer 44 are directly applied to the physical layer device (PITY) 84 of IP telephone 38. Similarly this condition causes transmit signals from PHY 84 to be coupled to output winding 80 of transformer 52.

The details of a common low pass filter 68 are shown by way of example in FIG. 2. FIG. 2 is a typical LPF circuit including three capacitors C1, C2, C3, and four inductors L1, L2, L3, L4. The input signal is differential and is applied at modes IN+, IN− and the output signal is differential and is obtained at modes OUT+, OUT−. Such devices are difficult to integrate onto an integrated circuit with current technology and thus must actually be fabricated with discreet components or is known to those of ordinary skill in the art.

Relays 62 and 70 and LPF 68 are physically relatively large and tend to be relatively expensive parts. Furthermore, relays can wear out and/or suffer from intermittent failures and are thus not considered to be the most reliable of electronic devices. Accordingly, it is desirable to replace the need for relays and discreet filter components in circuits of this type and to further miniaturize the loop back control circuit.

SUMMARY OF THE INVENTION

A method and apparatus provide an IP telephone or similar device with a mechanism to receive and at least briefly loop back discovery signals received from a telecommunications device such as an Ethernet switch while not permitting the loop back of data packet signals. No mechanical relays are required and the circuitry can be fully integrated on an integrated circuit using commonly available techniques, if desired.

BRIEF DESCRIPTION OF THE FIGURES

The accompanying drawings, which are incorporated into and constitute a part of this specification illustrate one or more embodiments of the invention and, together with the present description, serve to explain the principles and implementations of the invention.

In the drawings.

DETAILED DESCRIPTION

Embodiments of the present invention are described herein in the context of a method and apparatus for controlling loop back of a differential mode signal through a remote device without the use of a powered circuit or a relay at the remote device. Those of ordinary skill in the art will realize that the following description of the present invention is illustrative only and not intended to be in any way limiting. Other embodiments of the invention will readily suggest themselves to such skilled persons having the benefit of this disclosure. Reference will now be made in detail to a number of implementations of the present invention as illustrated in the accompanying drawings. The same reference numbers will be used throughout the drawings and the following description to refer to the same or like parts.

In the interest of clarity, not all of the routine features of the implementations described herein are described. It will of course be appreciated that in the development of any such actual implementation, numerous implementation-specific decisions must be made to achieve the developer's specific goals, such as compliance with system- and business-related goals and that these goals will vary from one implementation to another. Moreover, it will be appreciated that such a development effort might be complex and time-consuming, but would never the less be a routine undertaking of engineering for those of ordinary skill in the art having the benefit of this disclosure.

The present invention is directed to replacing the prior art circuitry relay and LPF components of the data packet loop back prevention circuit to make a more compact, inexpensive and reliable IP telephone (or similar network device). A primary difficulty which must be overcome is the fact that the IP telephone is likely entirely unpowered during the discovery phase since phantom power will not generally be provided until after the discovery phase is complete. Thus, powered active circuitry cannot normally be used to detect and respond to the discovery signal.

Figure 1:
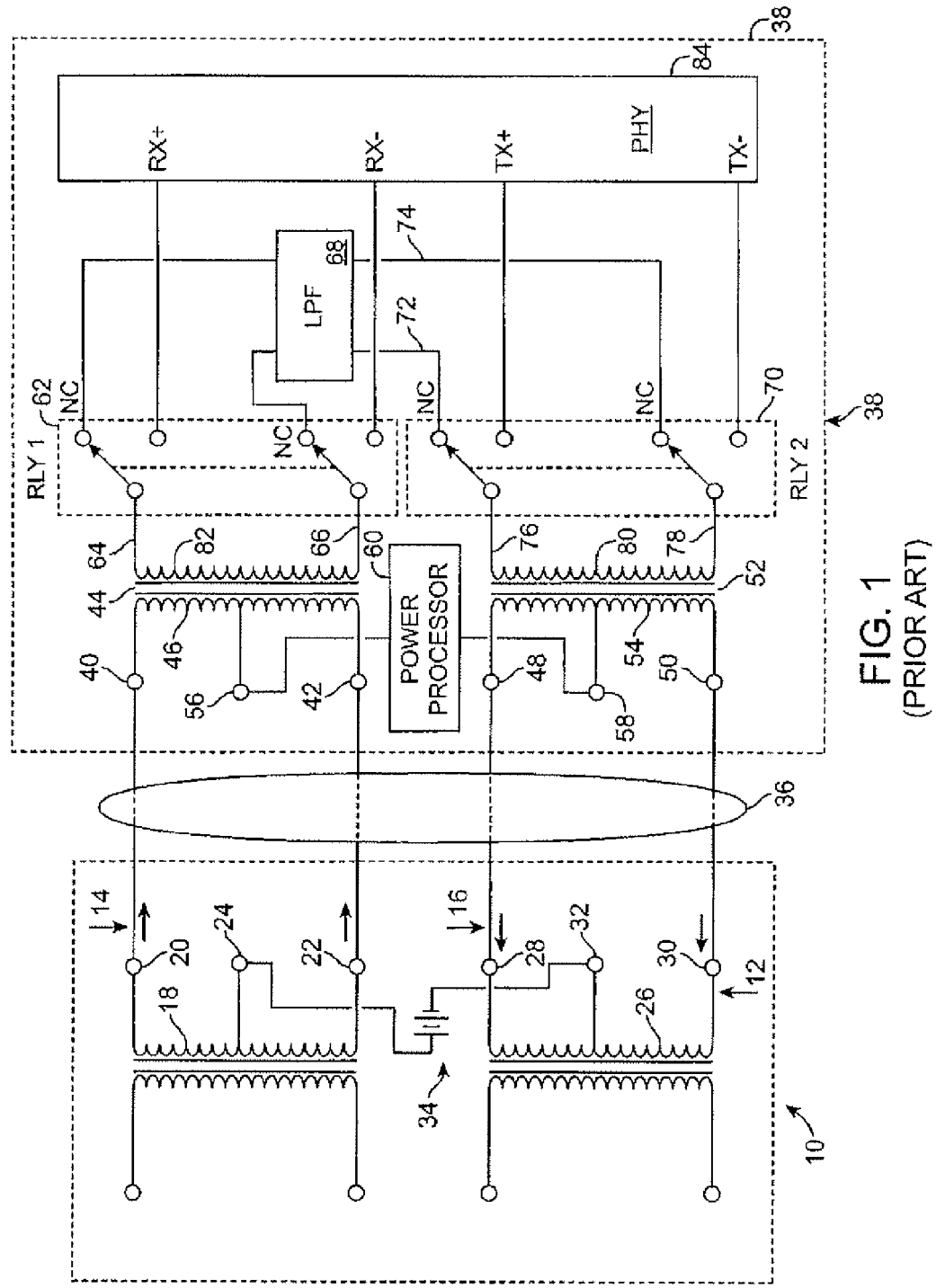
FIG. 1 is an electrical schematic diagram of a telecommunications system in accordance with the prior art.
Figure 2:
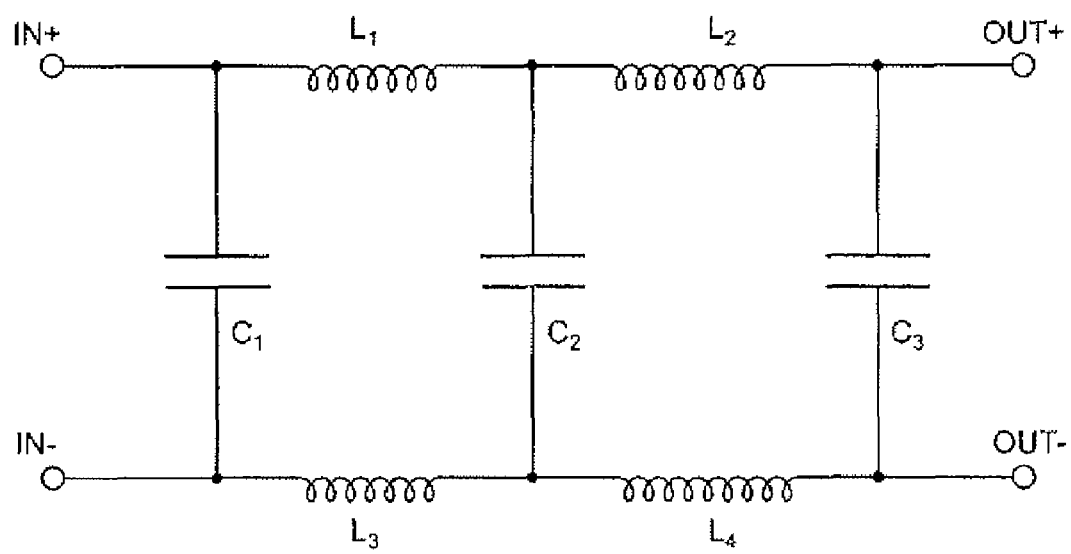
FIG. 2 is an electrical schematic diagram illustrating a low pass filter in accordance with the prior art.
Figure 3:
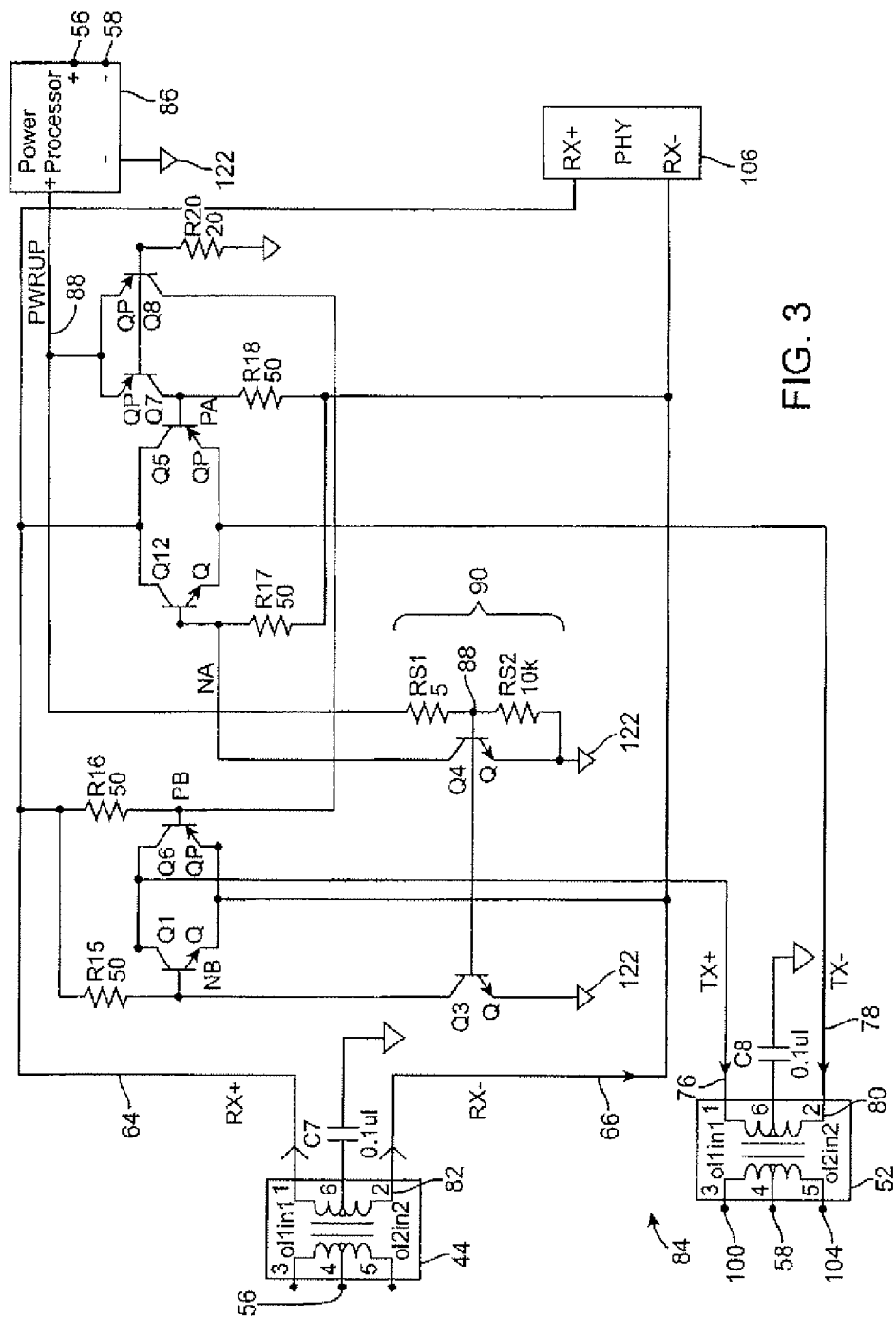
FIG. 3 is an electrical schematic diagram illustrating a switching circuit in accordance with a specific embodiment of the present invention.

Circuit 84, as shown schematically in FIG. 3, illustrates a specific embodiment of the present invention. Receive transformer 44 receives a differential AC signal over, for example, a twisted pair line coupled to a first transformer winding disposed between pins 3 and 5 of receive transformer 44. A center-tap is provided between pins 3 and 5 in order to extract phantom power at pin 4 (mode 56). The first transformer winding is magnetically coupled to a second transformer winding disposed between pins 1 and 2 of receive transformer 44. The second transformer winding is coupled to lines RX+ (64) and RX−(66), respectively. A first steering circuit is formed of NPN bipolar transistor Q1 and PNP bipolar transistor Q6. Under normal conditions (i.e., no phantom power applied) first steering circuit simply drives transmit transformer 52 TX+ line 76 in substantially the same phase as the signal received on line RX+. Similarly and simultaneously, a second steering circuit formed of NPN bipolar transistor Q12 and PNP bipolar transistor Q5 drives transmit transformer 52 TX− line 78 in substantially the same phase as the signal received on line RX−.

When phantom power is applied to nodes 56 and 58, power processor 86 becomes energized and provides a "PWRUP" signal on line 88. The PWRUP signal on line 88 turns on NPN bipolar transistors Q3 and Q4 by applying a positive voltage to node 88 of voltage divider 90 thus connecting the bases of Q1 and Q12 to ground.

Figure 4:
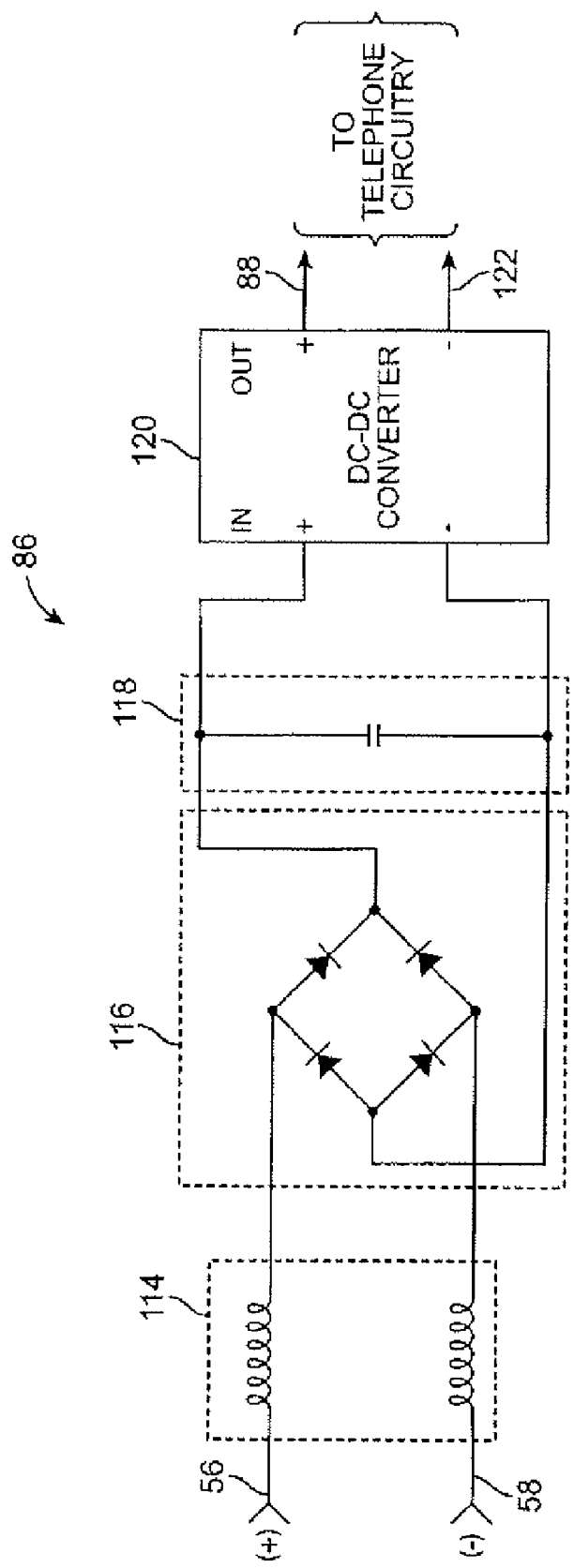
FIG. 4 is an electrical schematic diagram illustrating a power processor circuit in accordance with the prior art.

The power processor 86, shown in more detail in FIG. 4, receives power on lines 56 and 58 and conventionally includes a filter 114, a rectifier 116, a filter capacitor 118 and a DC-DC converter 120. Other similar arrangements are also well known to those of ordinary skill in the art. The power processor 86 may perform DC-DC power conversion and filtering as required, as well as providing power to nodes 88 (PWRUP) and 122 (ground).

At the same time as PWRUP goes high, because the bases of PNP bipolar transistors Q7 and Q8 are at ground potential through pull down resistor R20 and the emitters of Q7 and Q8 are at PWRUP (node 88) Q7 and Q8 are turned on and hence Q5, the base of which is connected through PNP bipolar transistor Q7 to PWRUP and Q6, the base of which is connected through PNP bipolar transistor Q8 to PWRUP, are both forced off by the application of a relatively high voltage to their respective bases. As a result, when PWRUP appears, the loop back feature promptly turns off. Notably, no local power supply is required to enable this feature and it is powered entirely by signal level power on RX+, RX− with the appearance of phantom power at the network device turning it off.

Figure 5:
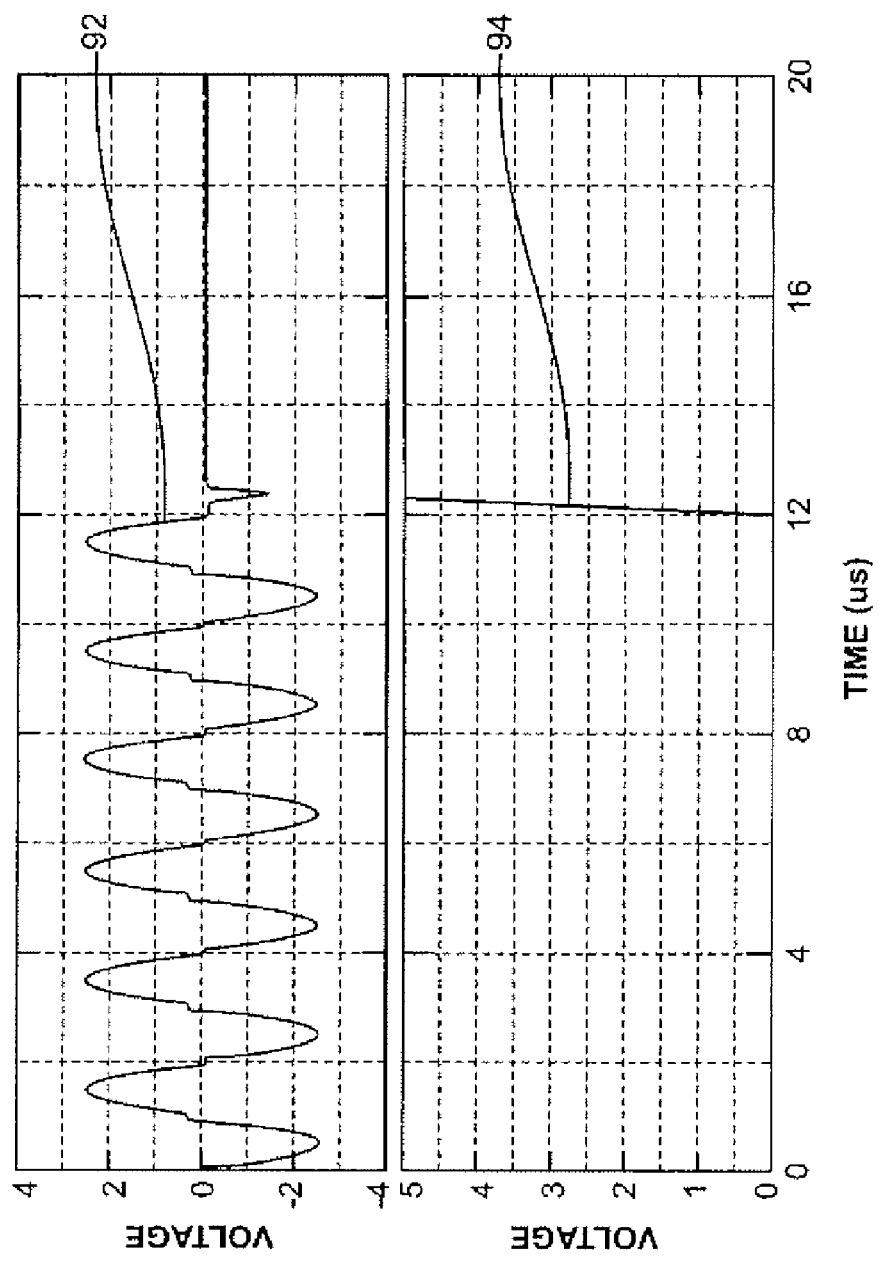
FIG. 5 is a plot of differential output signals of the circuit of FIG. 3 and the PWRUP signal as it rises in accordance with a specific embodiment of the present invention.

FIG. 5 is a plot 92 of the loop back signal voltage of the circuit of FIG. 3 versus time and a plot 94 of the PWRUP signal voltage in the circuit of FIG. 3 versus time. As can be seen, with a sinusoidal discovery tone of 1 cycle per 2 microseconds (500 KHz) from PWRUP, the loop back signal turns off in less than 1 microsecond after PWRUP goes high.

Figure 6:
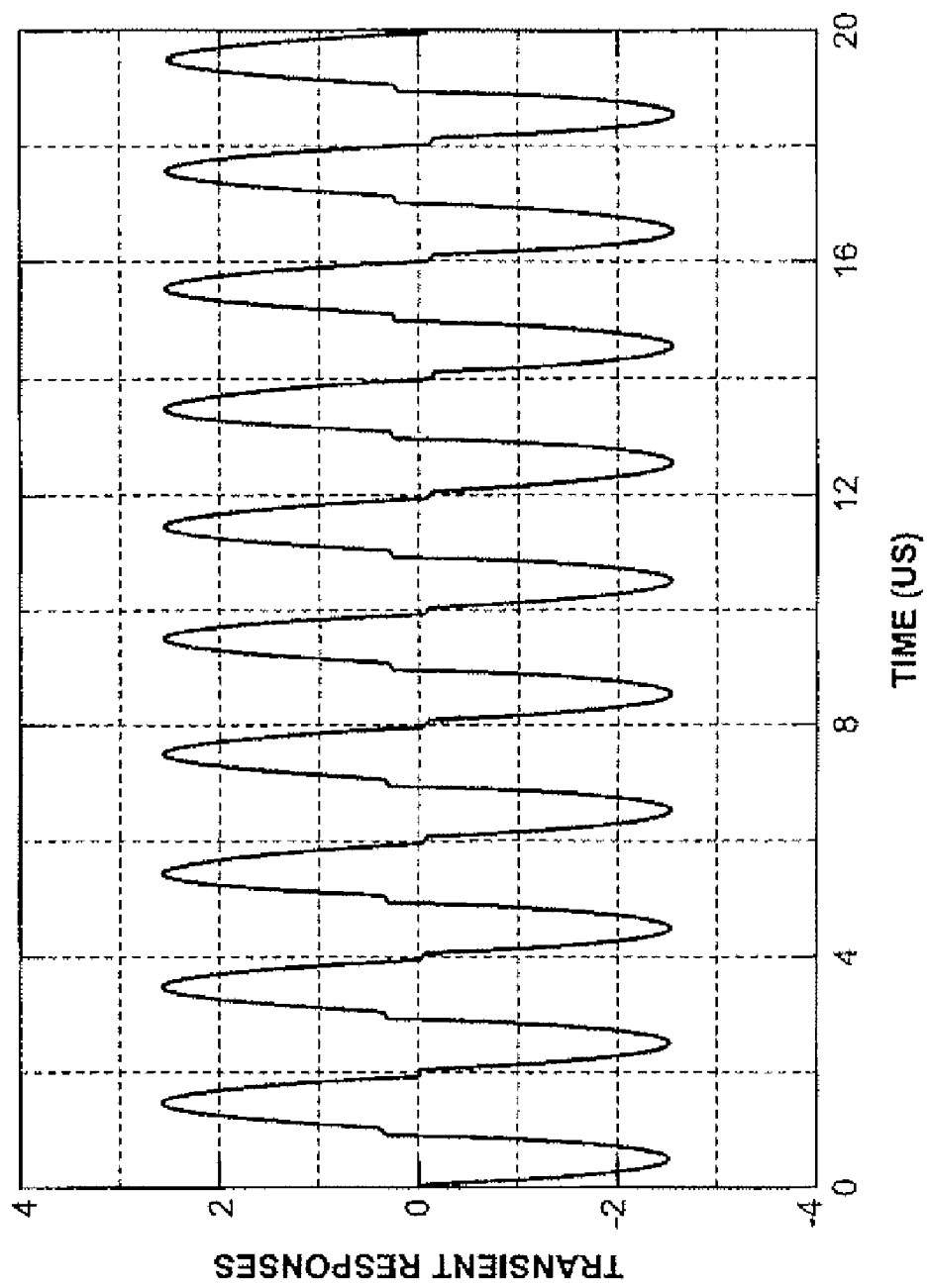
FIG. 6 is a plot of the loop back discovery signal in accordance with a specific embodiment of the present invention.

FIG. 6 is a plot 96 of the loop back discovery tone. The discovery tone may preferably be a sinusoidal signal of less than a few megahertz in frequency. A sinusoidal signal is not absolutely required, but is preferred because it is less likely to cause spurious emissions. A signal of less than a few megahertz in frequency will easily propagate with insignificant voltage loss on twisted pair wire to the well-known Ethernet point to point maximum connection requirement of 140 meters.

Figure 7:
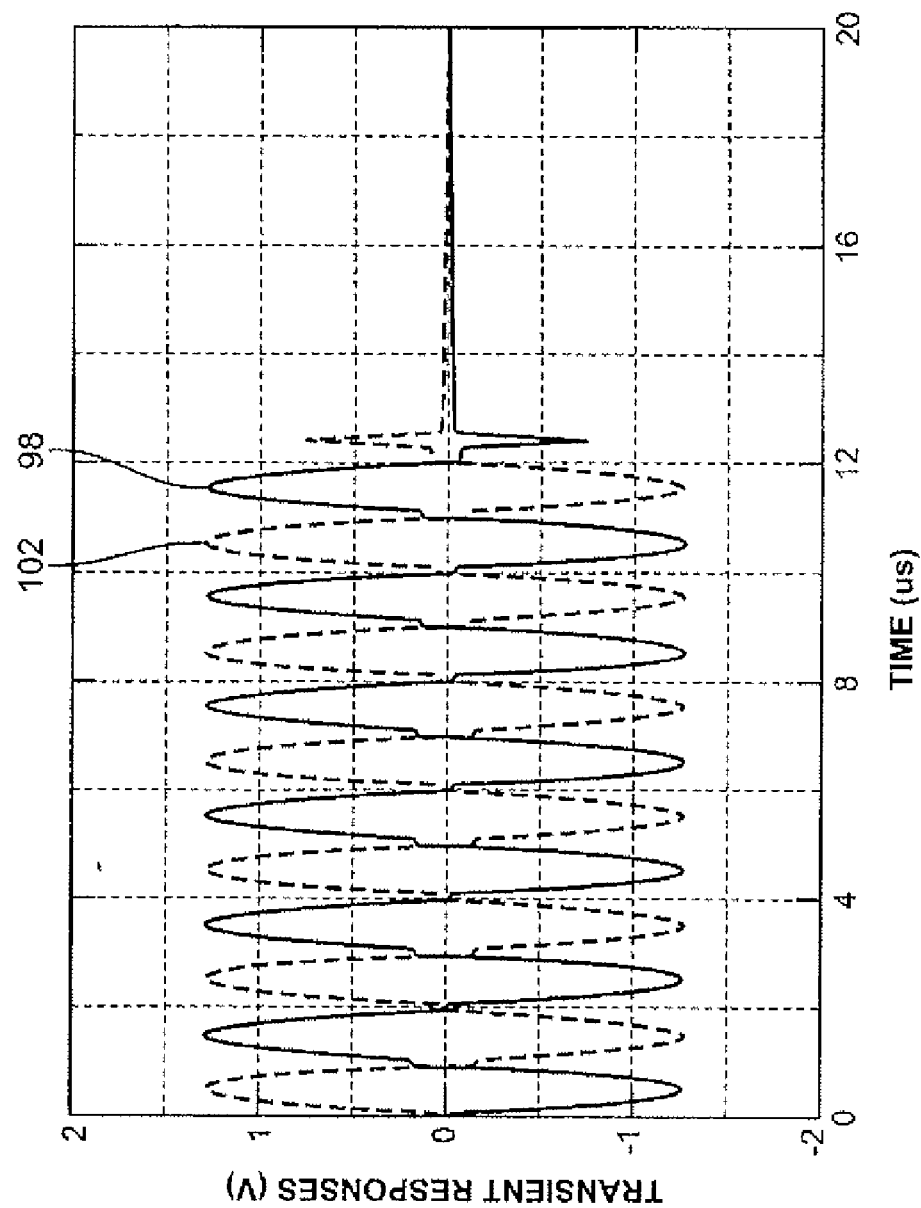
FIG. 7 is a plot of the loop back discovery signal through the circuit of FIG. 3 during the rise of the PWRUP signal in accordance with a specific embodiment of the present invention.

FIG. 7 is a plot of the differential loop back discovery tone. Plot 98 corresponds to the voltage at node 100 and plot 102 corresponds to the voltage at node 104. FIG. 7 illustrates the voltage at node 100 and 104 where no Electro Static Discharge (ESD) diodes are present in PHY 106.

Figure 8:
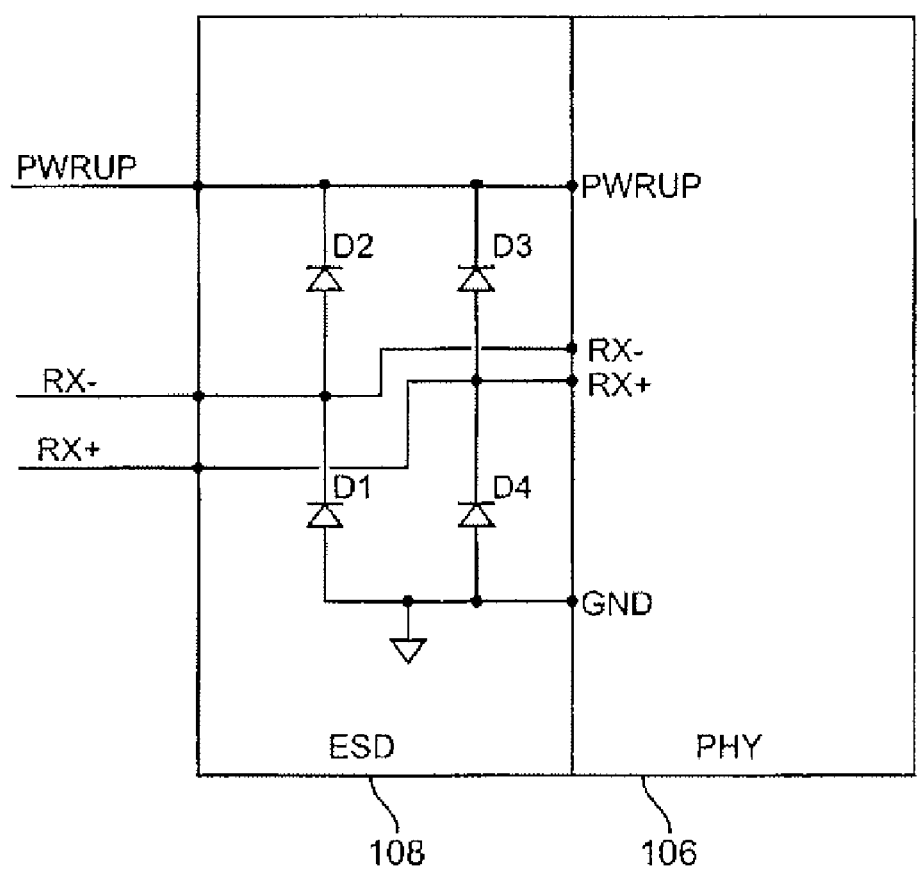
FIG. 8 is an electrical schematic diagram of a conventional ESD protection circuit for a conventional physical layer device.
Figure 9:
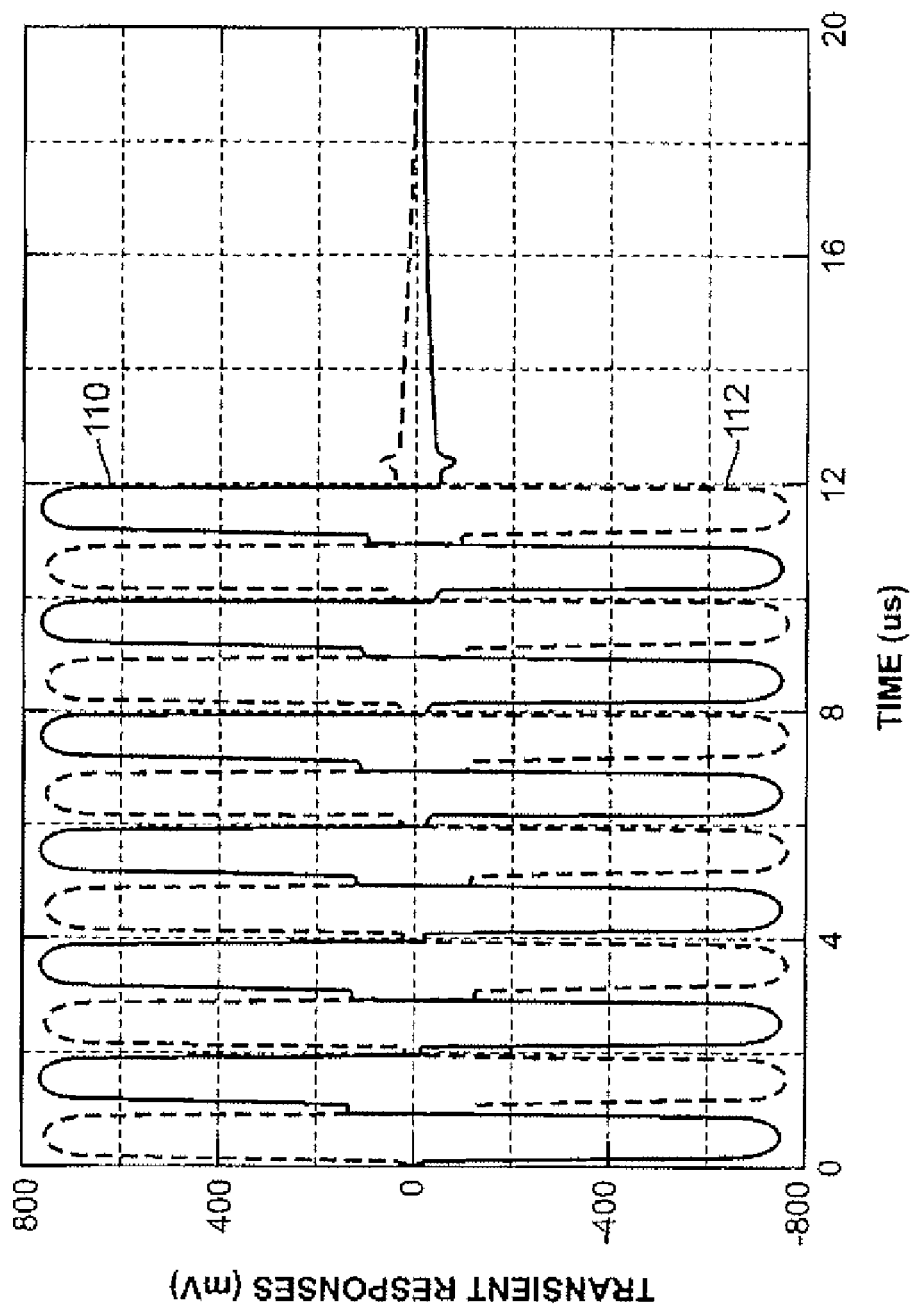
FIG. 9 is plot of the loop back discovery signal through the circuit of FIG. 3 as modified by FIG. 8 during the rise of the PWRUP signal in accordance with a specific embodiment of the present invention.

FIG. 8 is an electrical schematic diagram of a conventional ESD protection circuit 108 for a conventional PHY 106. ESD diodes D1, D2, D3, and D4 clip voltage on lines RX− and RX+ to avoid damage to sensitive electronic circuits inside PHY 106. The result is typically that instead of the 2.5 volt peak to peak swings of FIG. 7, the measured voltage at node 100 corresponds to plot 110 of FIG. 9 and the measured voltage at node 104 corresponds to plot 112 of FIG. 9 which show peak to peak voltage swings of only about 1.4 volts.

Figure 10A:
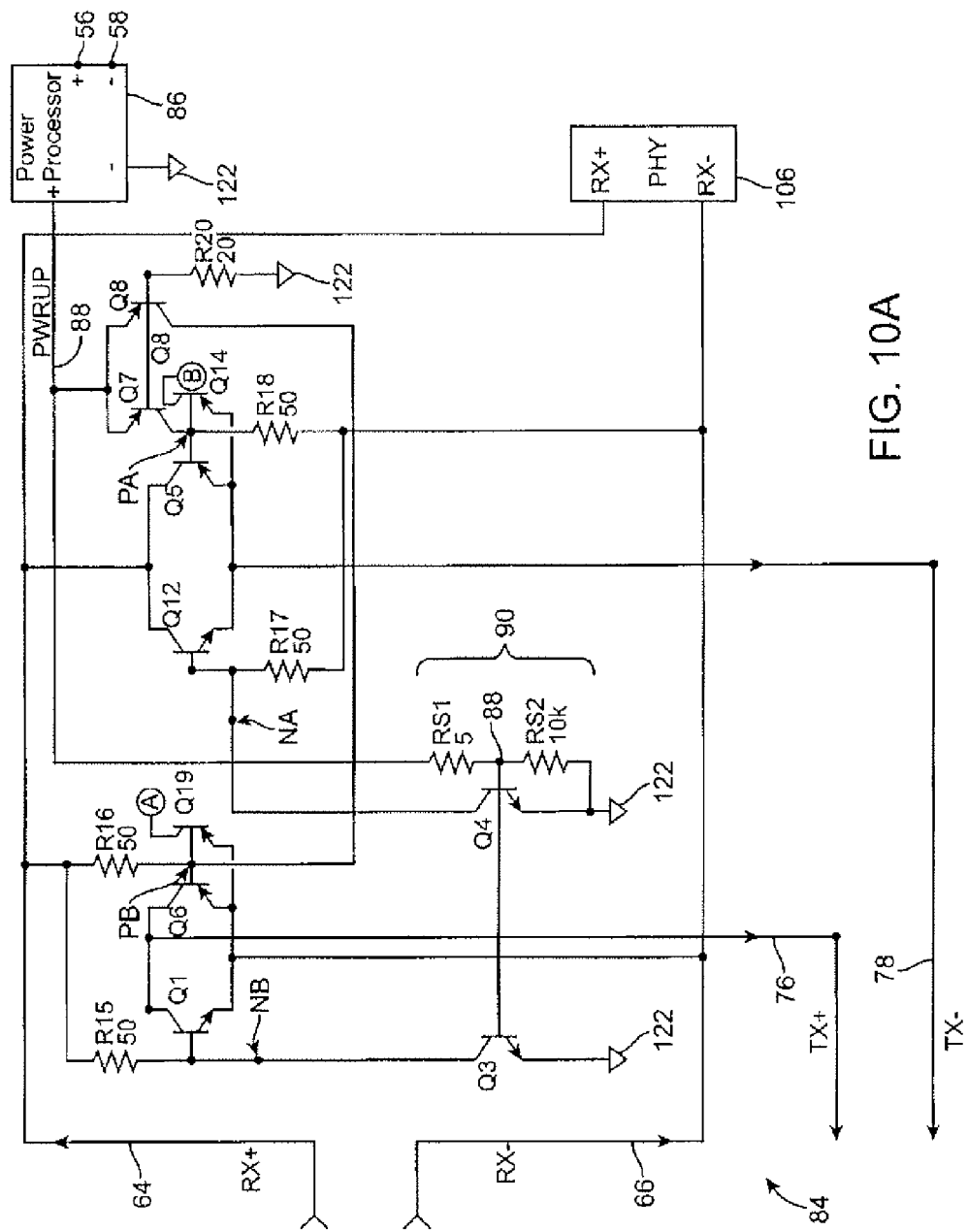
FIGS. 10A-10B are an electrical schematic diagram of an alternative specific embodiment of the present invention.
Figure 10B:
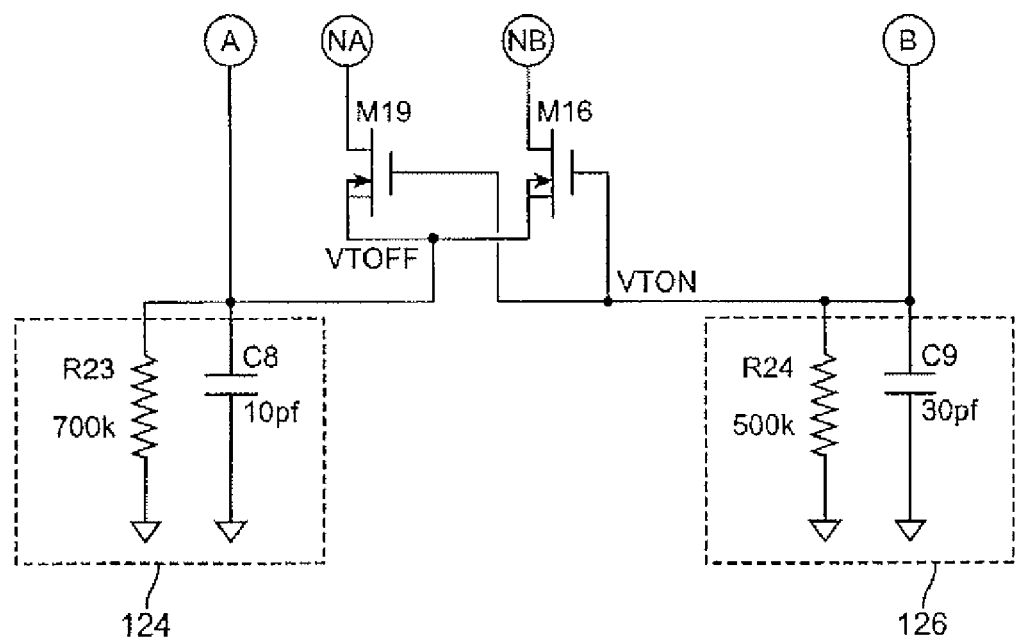

An alternative specific embodiment of the present invention is shown in FIGS. 10A and 10B which are in the form of an electrical schematic diagram. In the embodiment of FIGS. 10A and 10B, a filtering function is added to the basic circuit of FIG. 3. The new circuit now operates by adding PNP bipolar transistors Q19 and Q14. Q19 has its base and emitter connected in parallel with Q6 of the first steering circuit and Q14 has its base and emitter connected in parallel with Q5 of the second steering circuit. The collector of Q19 is coupled to node "A" and the collector of Q14 is coupled to node "B", both illustrated in FIG. 10B. Mode "NA" is the collector of Q4 and node "NB" is the collector of Q3. As can be seen in FIG. 10B, circuit elements 124 and 126 are RC timing circuits which include, respectively, R23 and C8 and R24 and C9. C8 and C9 are charged by the normal loop back operation of circuit 84 passing the discovery signal. R23 and R24 serve to discharge C8 and C9, respectively, so that C8 and C9 will be discharged when the network device is disconnected or the switch is powered off.

The goal in this version of the circuit is to permit brief loop back for detection purposes and then to shut off the loop back capability after having given the switch sufficient time to accomplish the discovery function. By shutting off the loop back feature promptly, undesirable loop back of data packets is avoided without the use of an LPF.

Turning to FIG. 10B, a portion of the positive current from Q5 is mirrored into Q14 and passed to node B. Similarly, a portion of the positive current from Q6 is mirrored into Q19 and passed to node A. C8 and C9 became charged which drives node VTON high turning on N-channel FETs M16 and M19 (sometimes referred to herein as switches) since VTON is coupled to the gates of FETs M16 and M19. This forces nodes NA and NB high because node A is held high by C8 and this then forces Q1 and Q12 to turn on thus distorting the differential signal on TX+, TX− to the point that it cannot be transmitted through transformer 52.

Figure 11A:
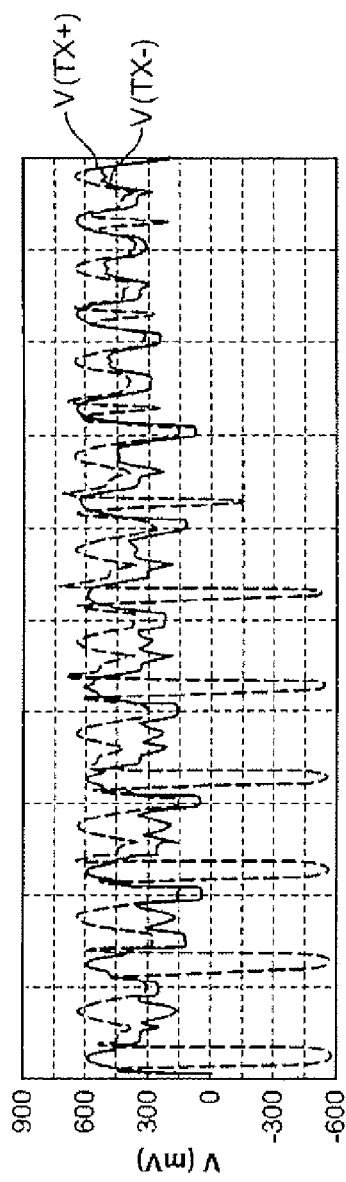
FIG. 11A is a plot of V(TX+) and V(TX−) versus time in accordance with the specific embodiment of FIGS. 10A-10B.
Figure 11B:
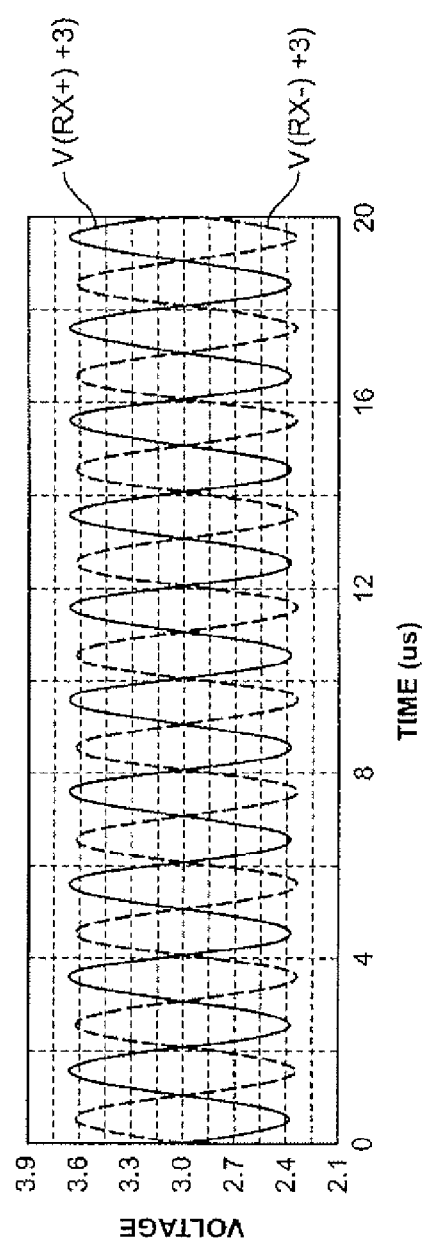
FIG. 11B is a plot of V(RX+) and V(RX−) with a constant offset voltage in accordance with the specific embodiment of FIGS. 10A-10B.

FIG. 11A illustrates the plot of the voltage of TX+ and TX− over time as the circuit of FIG. 10B turns on. As can be seen, the first few loop back pulses are intact, then they become increasingly attenuated with the TX+, TX− signal losing its differential node characteristics and thus becoming unpropagatable through a transformer or over a twisted pair cable. FIG. 11B illustrates the RX+, RX− signal (with an offset) corresponding to the TX+, TX− signal of FIG. 11A in time.

Figure 12A:
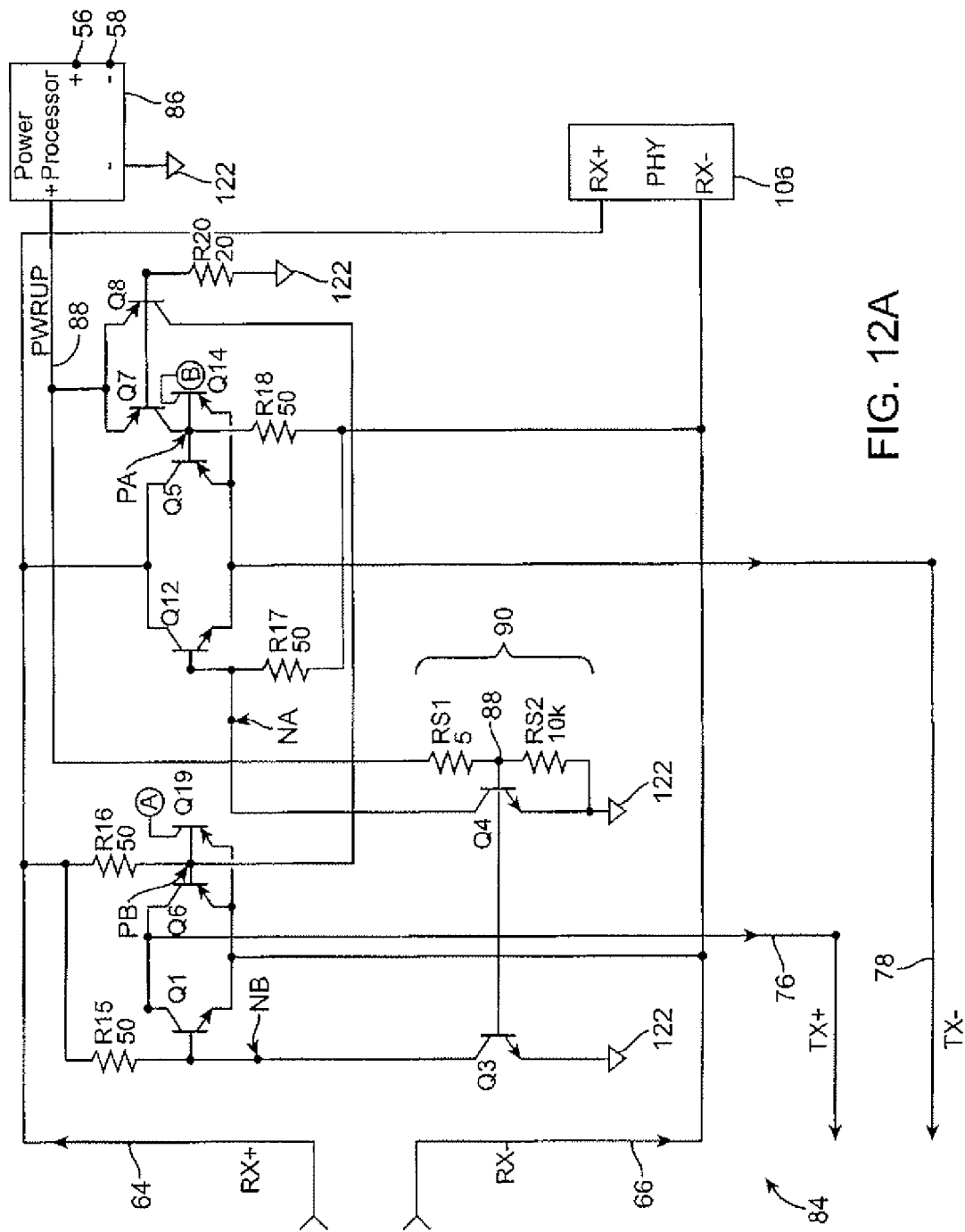
FIGS. 12A and 12B are an electrical schematic diagram of an alternative specific embodiment of the present invention.
Figure 12B:
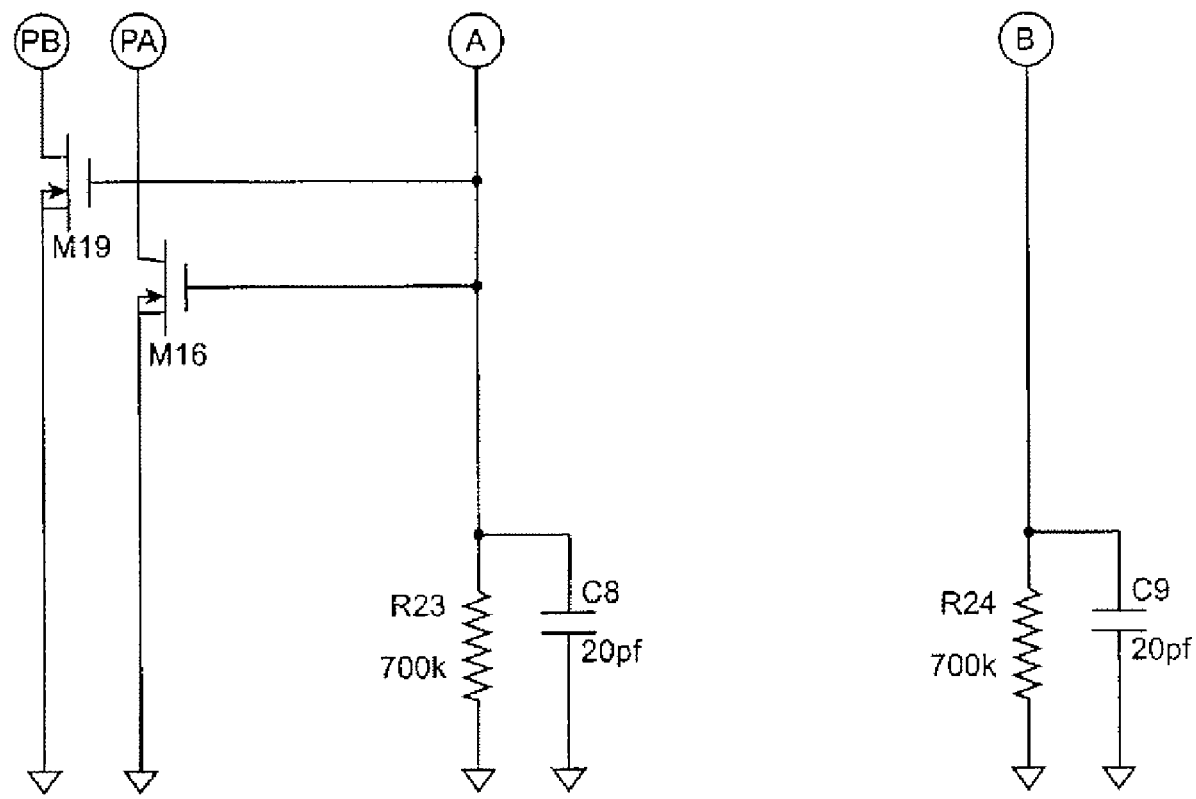
Figure 13:
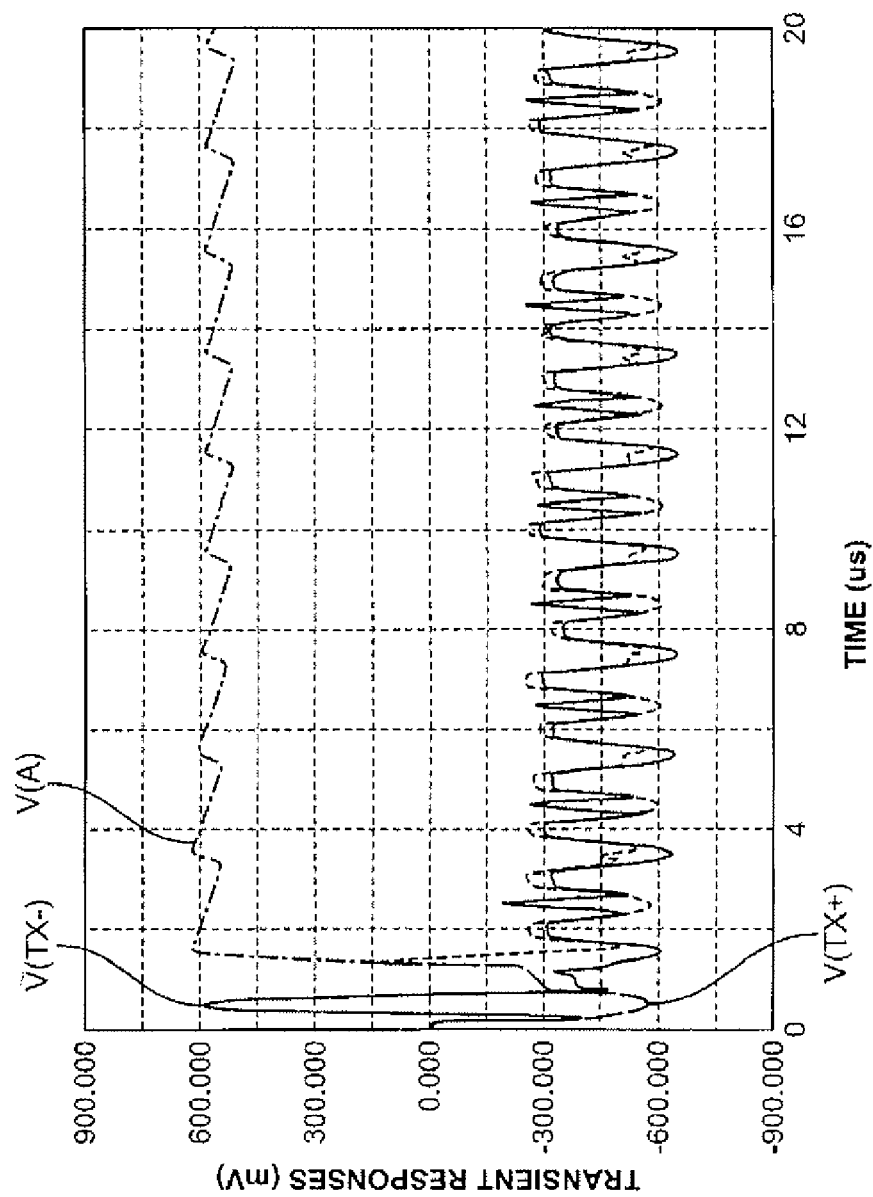
FIG. 13 is a plot of V(TX+), V(TX−) and V(A) versus time in accordance with the specific embodiment of FIGS. 12A-12B.

Another specific embodiment of the present invention is illustrated in the electrical schematic diagram of FIGS. 12A and 12B and its operation is modeled in the plots of FIG. 13. In this embodiment, the loop back of the discovery signal is briefly permitted. Once loop back commences, current is passed to node A through the Q6-Q19 current mirror. Once node A becomes active, C8 begins to charge taking node A and the gates of N-channel FETs M16 and M19 high. This takes nodes PB and PA low turning on Q14, Q5, Q19 and Q6 thus disrupting the pass through of differential signals on RX+, RX− to TX+, TX−. FIG. 13 shows the voltages of TX−, TX+ and node A over time in accordance with the operation of the circuit of FIGS. 12A and 12B.

Figure 14A:
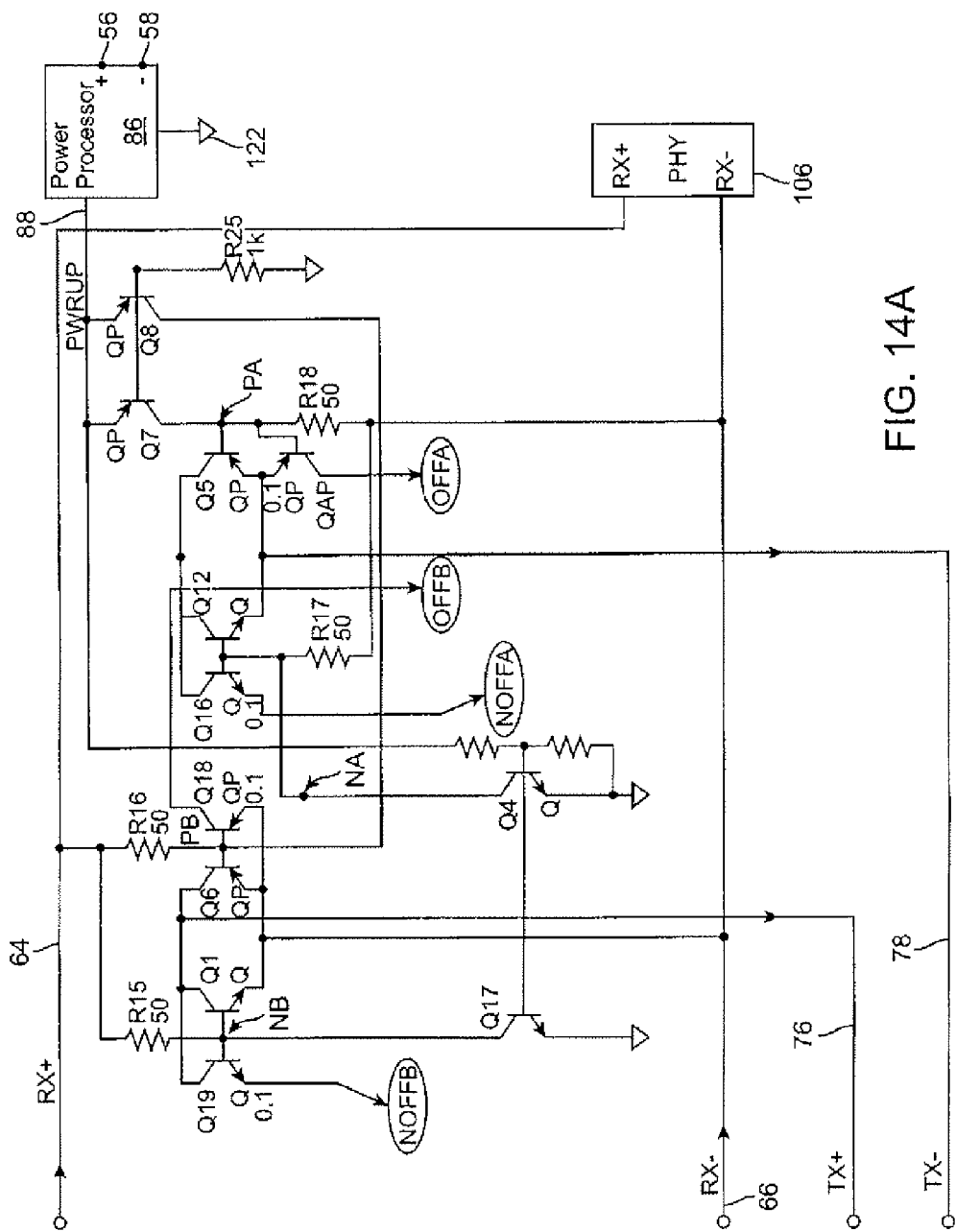
FIGS. 14A-14B are an electrical schematic diagram of an alternative specific embodiment of the present invention.
Figure 14B:
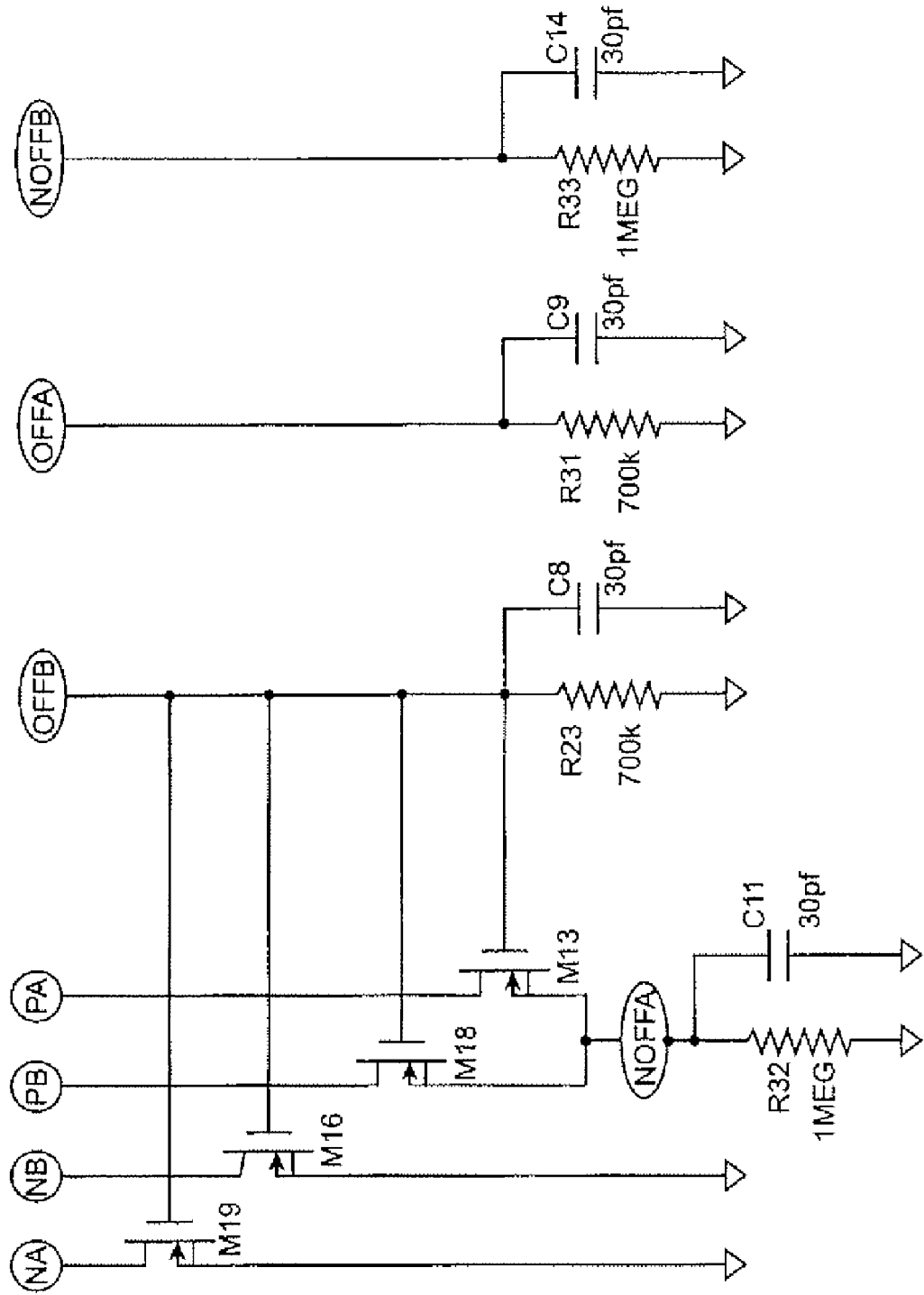
Figure 15:
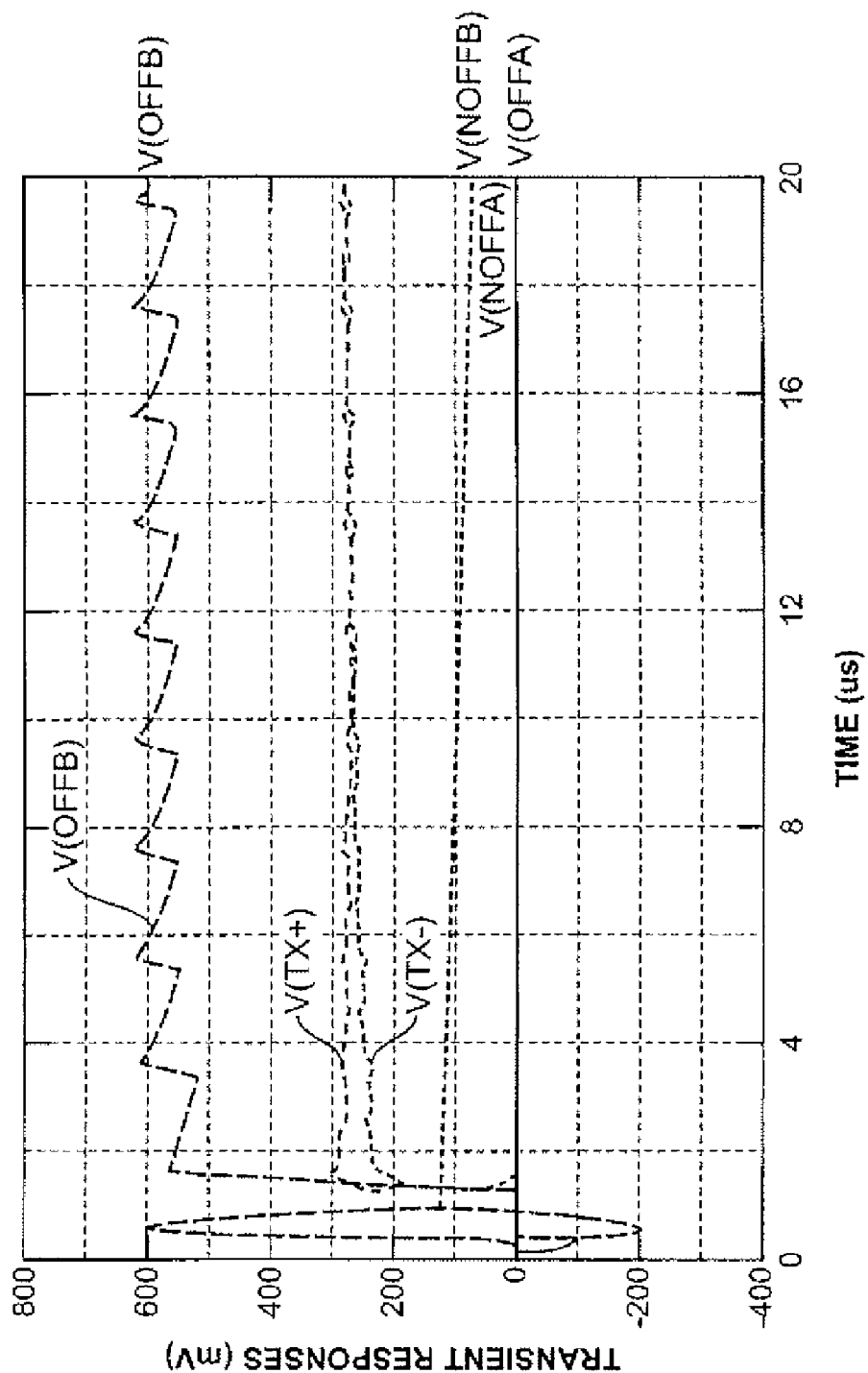
FIG. 15 is a plot of V(TX+), V(TX−), V(OFFB), V(NOFFB), V(OFFA) and V(NOFFA) versus time in accordance with the specific embodiment of FIGS. 14A-14B.

Another specific embodiment of the present invention is illustrated in the electrical schematic diagram of FIGS. 14A and 14B and its operation is modeled in the plots of FIG. 15. In this embodiment, the loop back of the discovery signal is only briefly permitted. Once loop back commences rectified current is passed to modes NOFFB and OFFB, through the current mirror/diode action of Q1-Q14 and Q6-Q18, respectively. With OFFB high, C8 charges up and holds the gates of N-channel FETS M19, M16, M18, and M13 high which, in turn, takes nodes NA and NB low. The idea here it to balance the impact by (1) removing the same amount of current from both sides; (2) making the loads the same on the mirrored NMOS and PMOS devices; and (3) presenting nodes OFFA and NOFFA with opposite polarities, one being at +0.7 VDC while the other is at −0.7 VDC.

Note that in this circuit loopback operation can be prevented in any of at least three ways: (1) disable only the gate of the NMOS devices in the loopback circuit in both switches (2) disable only the gate of the PMOS devices in the loopback circuit in both switches; (3) disable all gates of the NMOS and PMOS devices in the loopback circuits of both switches.

Accordingly, the circuitry driving TX+ and TX− is disrupted as shown in FIG. 15 so that one or a few discovery cycles are looped back over TX+, TX− followed quickly by the secession of the loop back function.

Figure 16:
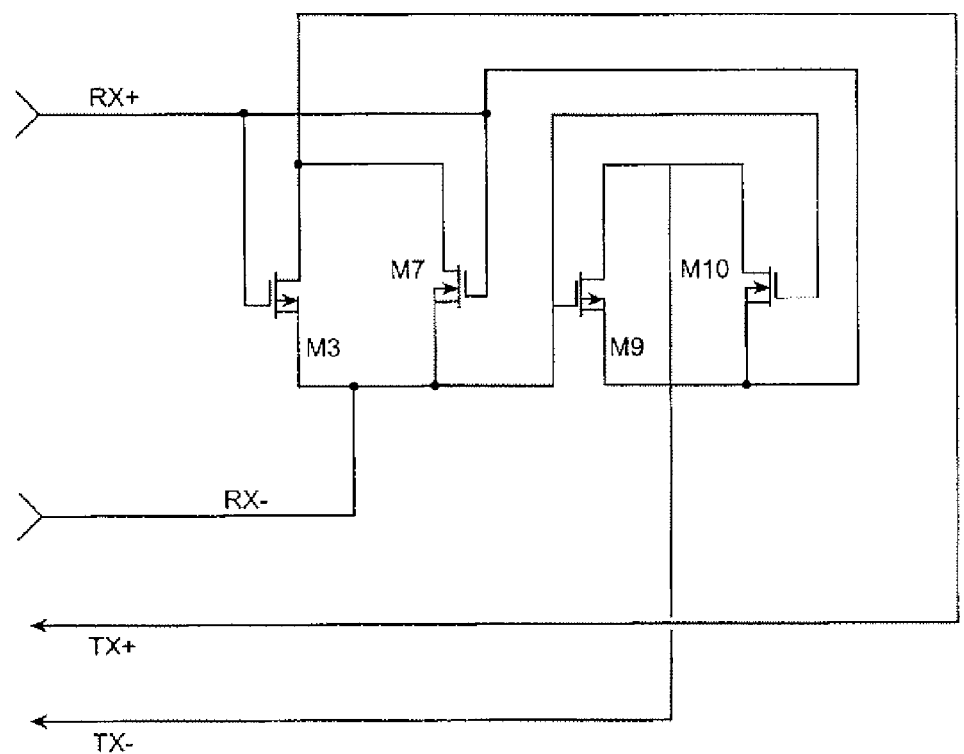
FIG. 16 is an electrical schematic diagram of an alternative specific embodiment of the present invention.
Figure 17:
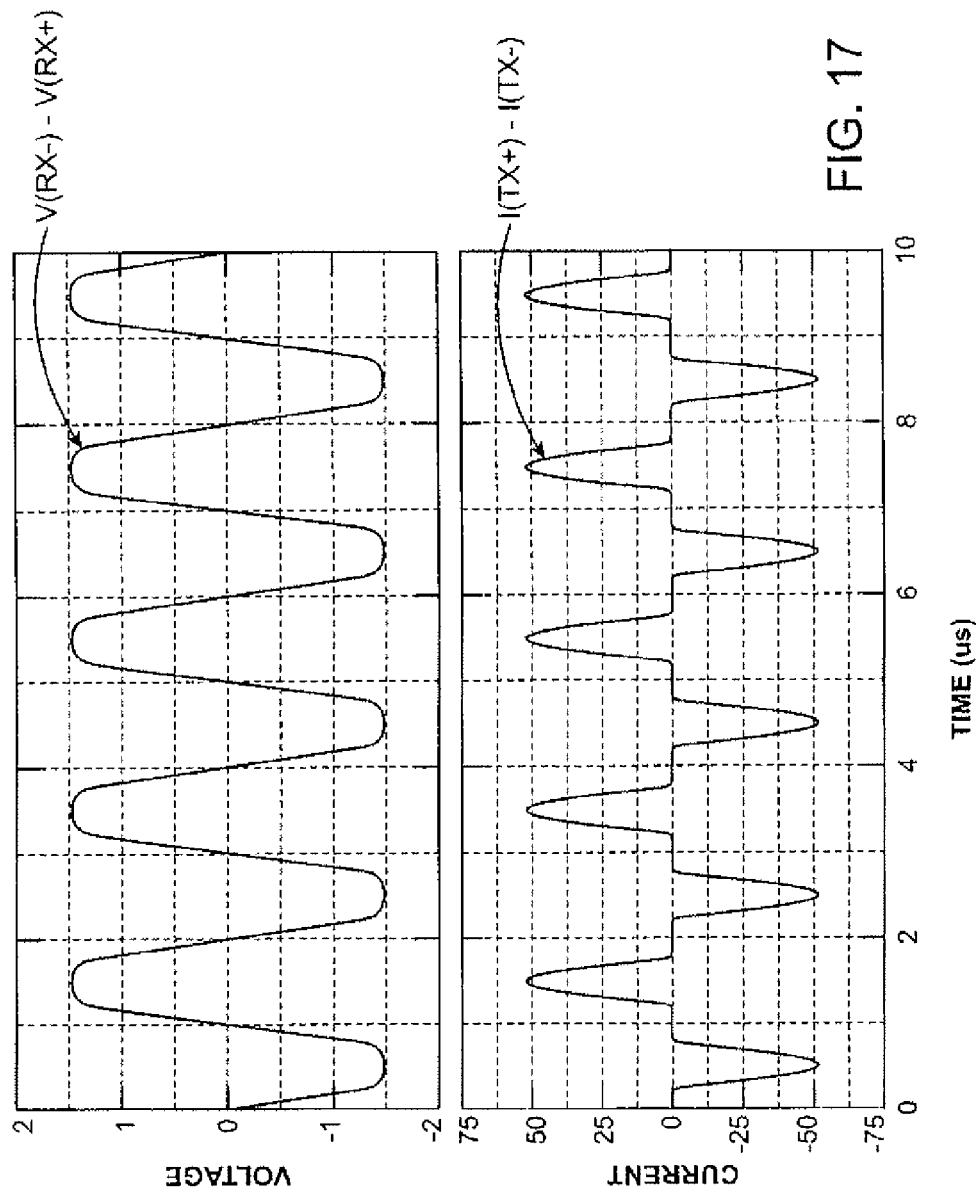
FIG. 17 is a plot of differential voltage and loop back currents in accordance with the specific embodiment of FIG. 16.
Figure 18:
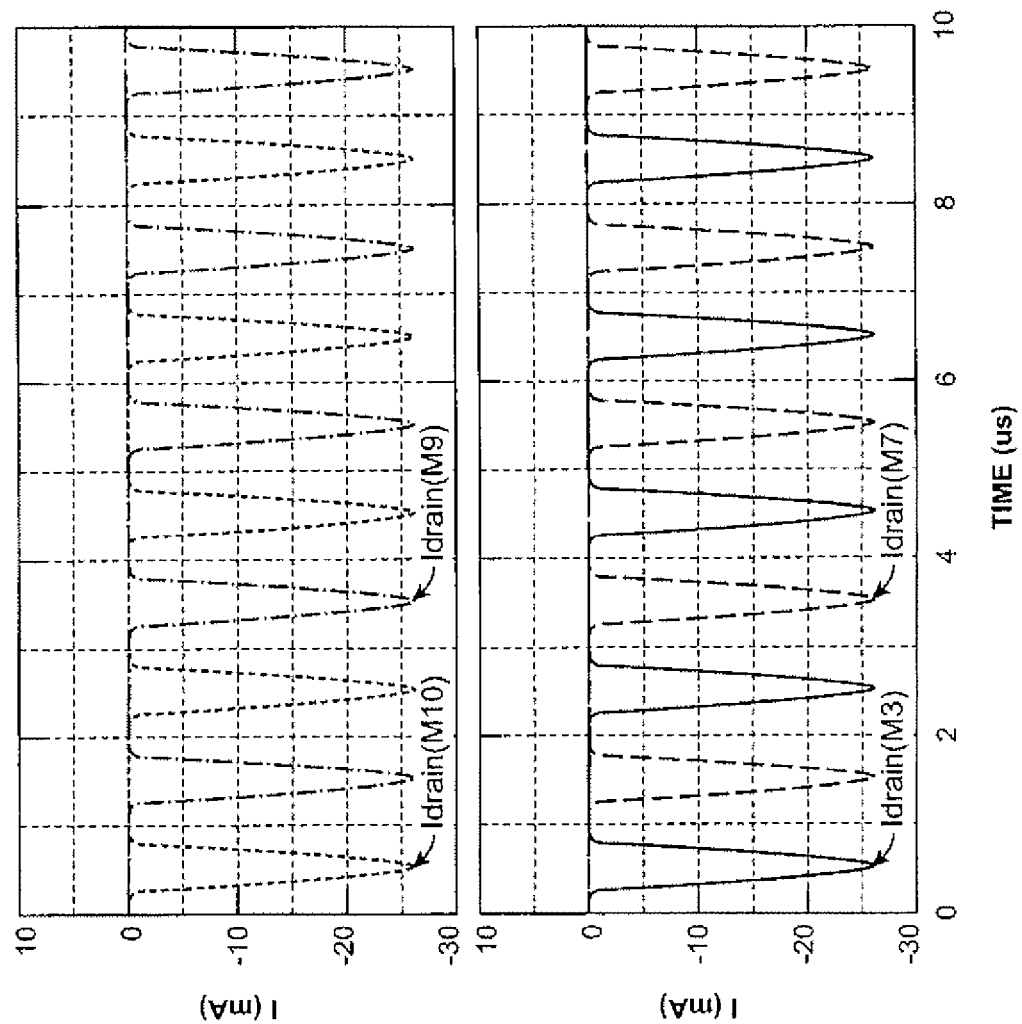
FIG. 18 is a plot of drain current through various transistors for the circuit of FIG. 16 in accordance with a specific embodiment of the present invention.

Finally, is should be noted that while a number of circuits using bipolar transistor technology have been shown, the concepts of this invention are equally applicable to FET-type transistors as long as they are constructed with thresholds appropriate to the expected signal levels as is well known to these of ordinary skill in the art. Turning now to FIG. 16, an electrical schematic diagram of a FET-type circuit corresponding to the bipolar design of FIG. 3 is shown. P-channel MOSFET M3 and N-Channel MOSFET M7 together form a first steering circuit driven by RX+, RX− and driving TX+. P-channel MOSFET M9 and N-channel MOSFET M10 together from a second steering circuit driven by RX+, RX− and driving TX−. FIG. 17 illustrates the operation of this circuit. The curve denoted V (RX−)−V(RX+) plots the difference in the voltage level of RX− and RX+ over time. FIG. 18 illustrates the current through the drains of devices M3, M7, M9 and M10 over time as shown.

Figure 19A:
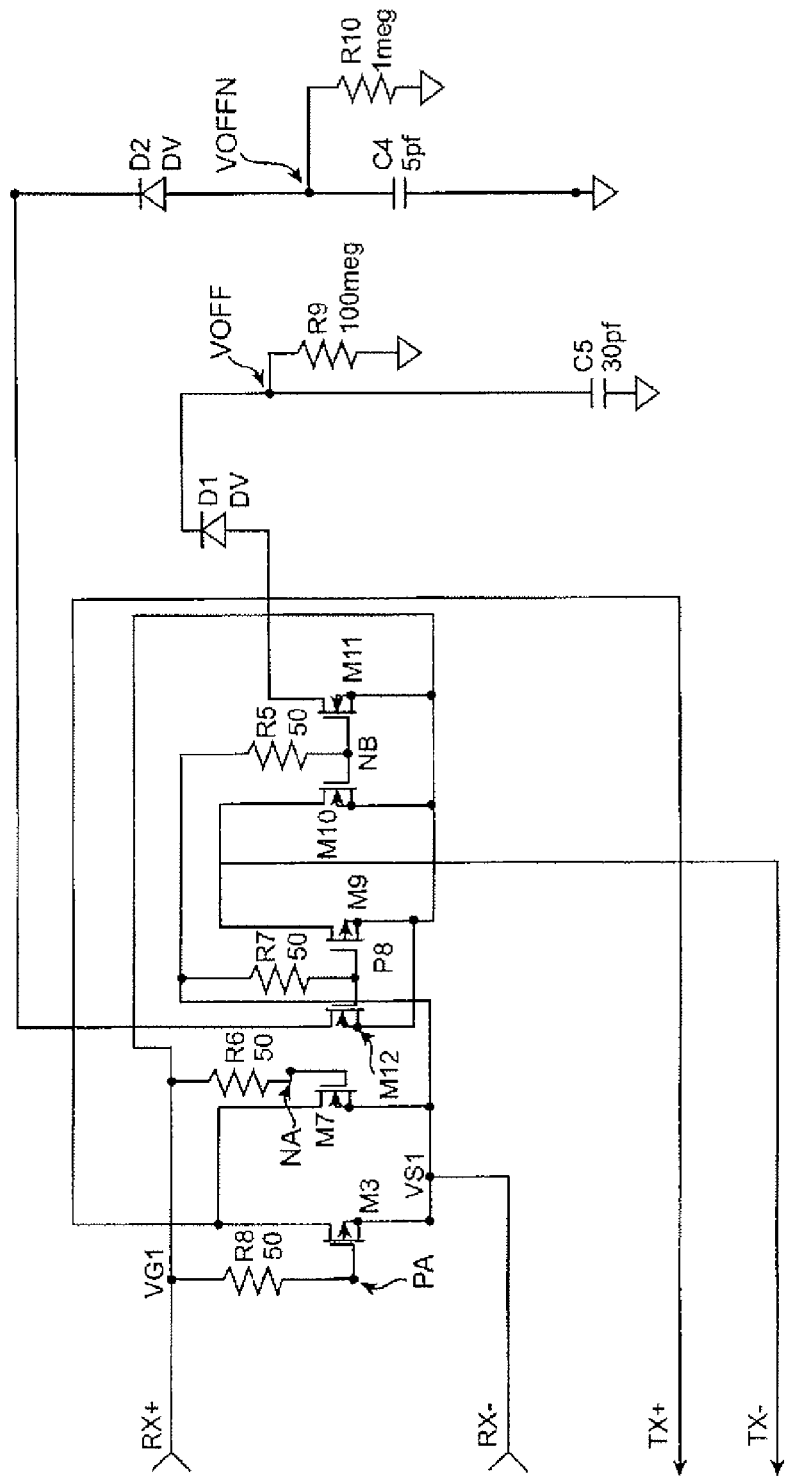
FIGS. 19A-19B are an electrical schematic diagram of an alternative specific embodiment of the present invention.
Figure 19B:
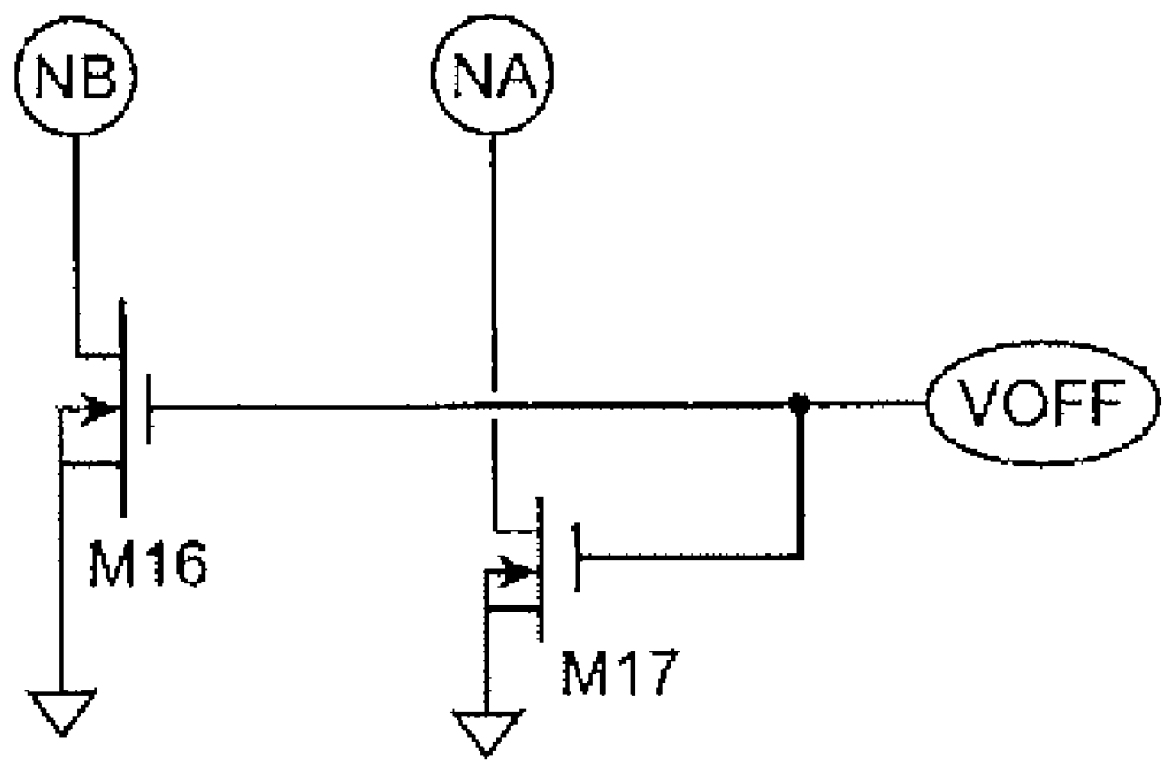

Turning now to FIGS. 19A-19B, an electrical schematic diagram of an alternative specific embodiment of the present invention illustrates the FET homologue of the bipolar circuit of FIGS. 10A-10B. In this circuit M11 mirrors some of the current in M19 driving node VOFF through diode D1 and M12 mirrors some of the current in M9 driving node VOFFN through diode D2. After a short time of operation VOFF is pulled low and held by capacitor C5 while VOFFN is pulled low and held by capacitor C4. Resistors R9 and R10 serve to discharge capacitors C5 and C4, respectively, after disconnection of RX+, RX−. Since VOFF is pulled high, as shown in FIG. 19B, it controls the gates of N-channel MOSFETS M16 and M17 tying nodes NA and NB to ground and thereby shutting off devices M7 and M10 which turns off the first and second steering circuits and stops the loop back function.

Figure 20:
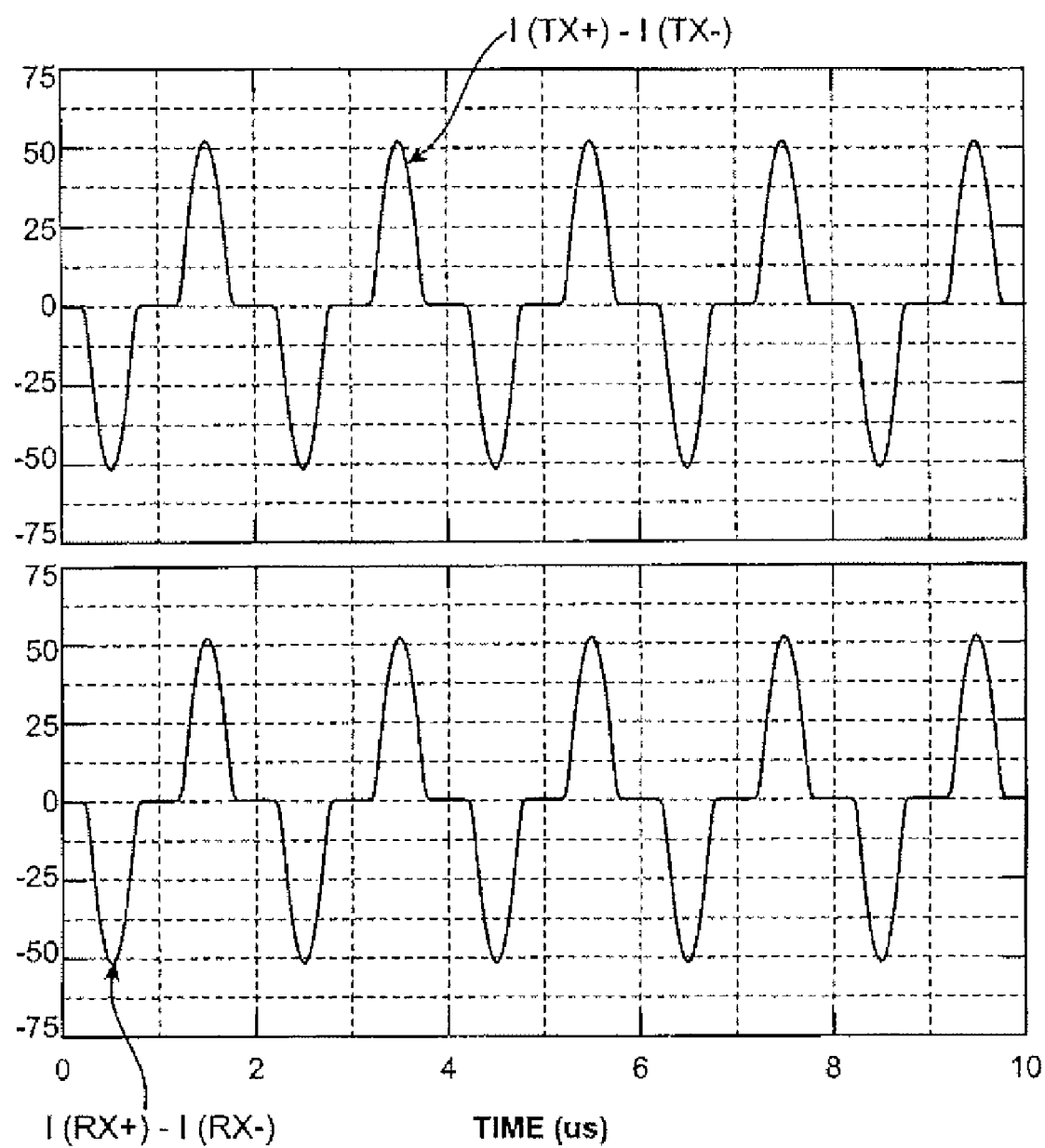
FIG. 20 is a plot of differential currents through portions of the circuit if FIGS. 19A-19B in accordance with a specific embodiment of the present invention.

FIG. 20 shows the plot of the differential TX current (I(TX+)−I(TX−)) at the top and the plot of the differential RX current (I(RX+)−I(RX−)) at the bottom during normal operation of the circuit of FIGS. 19A-19B (PWRUP not applied).

Figure 21:
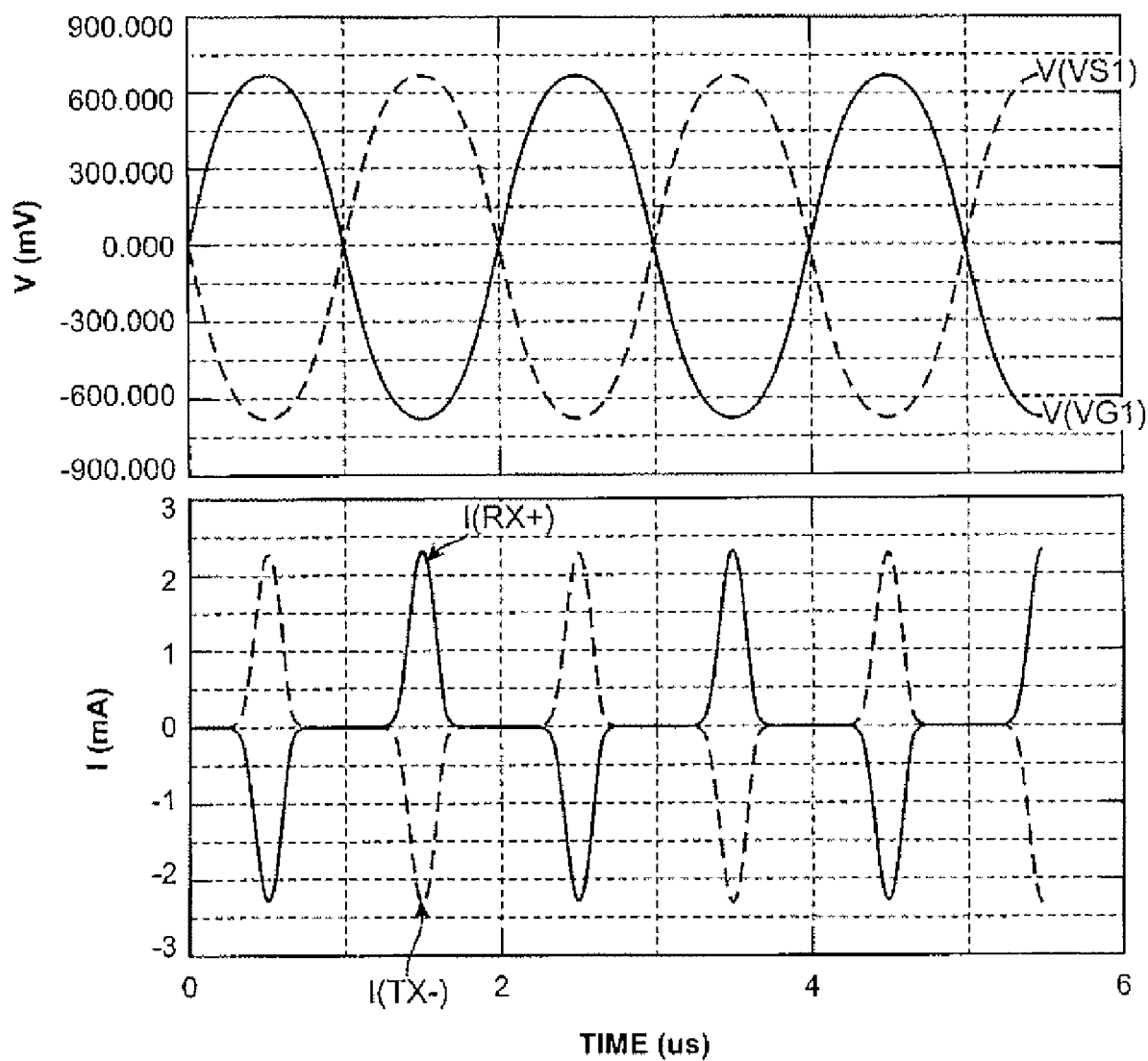
FIG. 21 is a plot of loop back voltage and current in accordance with the circuit of FIGS. 19A-19B.

FIG. 21 shows the plot of the voltage at modes VS1 and VG1 at the top and the plots of RX and TX current (I(RX+) and I(TX−)) at the bottom during normal operation of the circuit of FIGS. 19A-19B (PWRUP not applied)

Figure 22A:
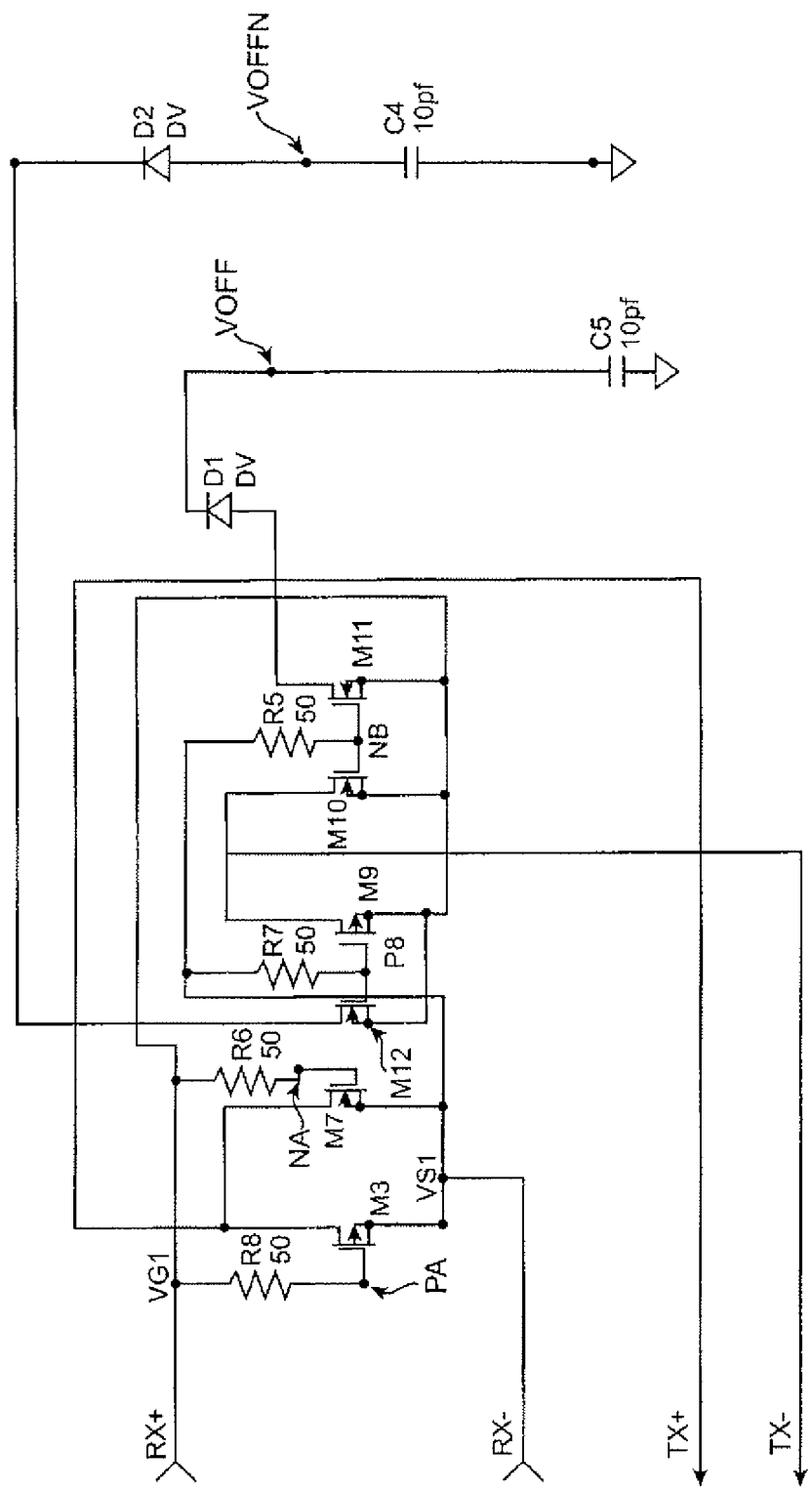
FIGS. 22A-22B are an electrical schematic diagram of an alternative specific embodiment of the present invention.
Figure 22B:
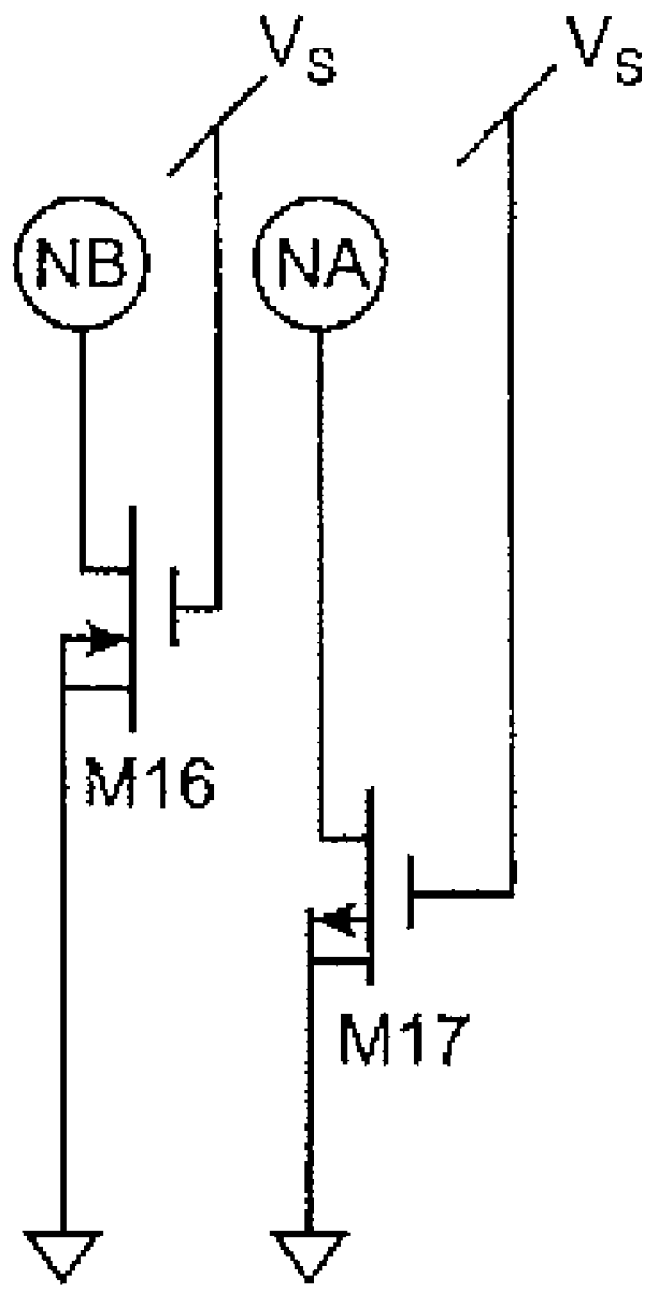
Figure 23:
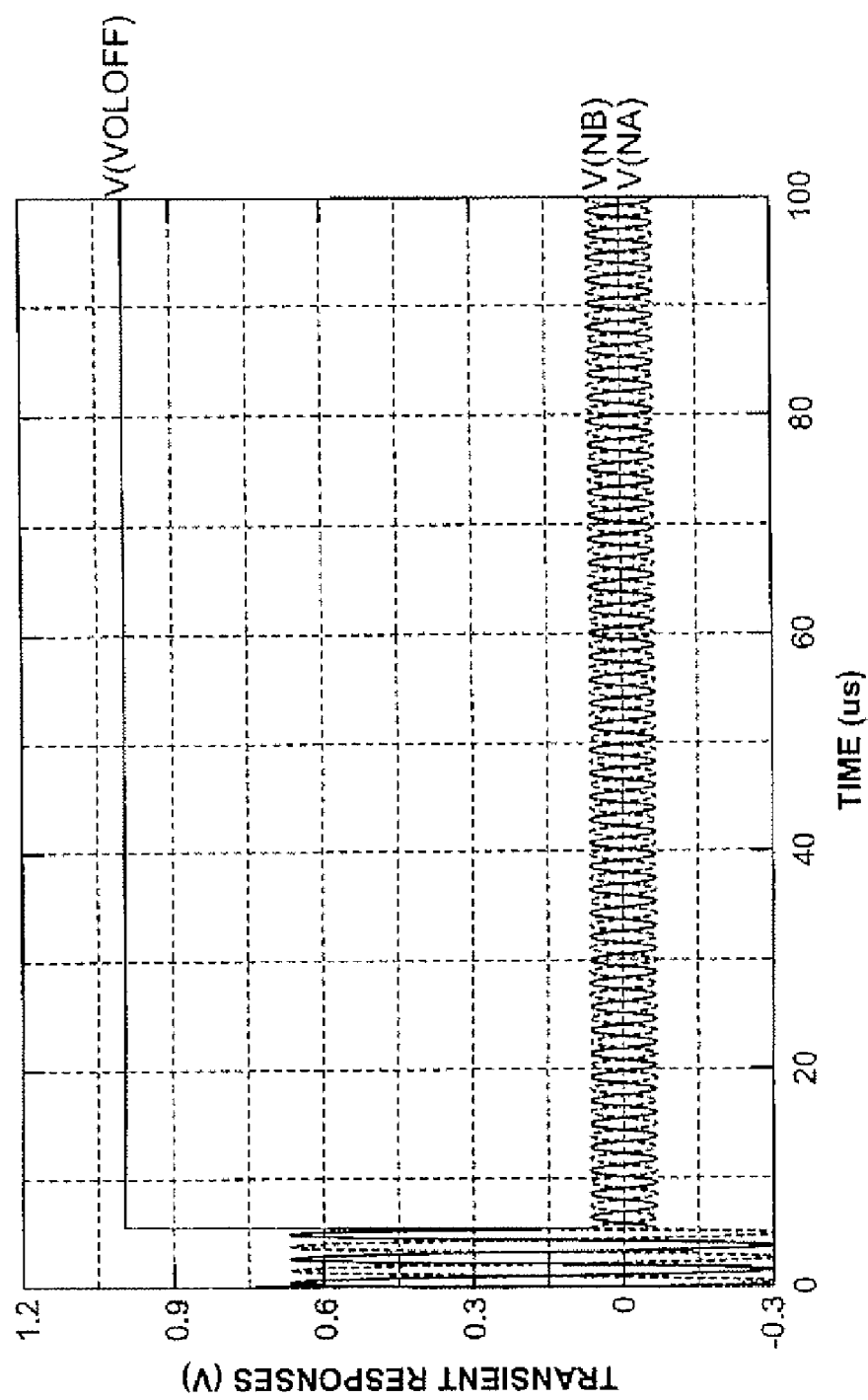
FIG. 23 is a plot of the voltage response of various portions of the circuit of FIGS. 22A-22B.

Turning now to FIGS. 22A and 22B a modification of the circuit of FIGS. 19A-19B is shown. In this version a clean voltage source Vs is used to set the gates of M16 and M17 of FIG. 22B high. This results in the plot shown in FIG. 23. The designation "VOLOFF" indicates the gate voltage for M16 and M17. Note also that node VOFFN, generated off of an NMOS device, is negative relative to ground while node VOFF, generated off of a PMOS device, is positive relative to ground. Diodes D1 and D2 are present to prevent the capacitors C5 and C4, respectively, from loosing charge on the snapback of the switches as they turn off.

Figure 24:
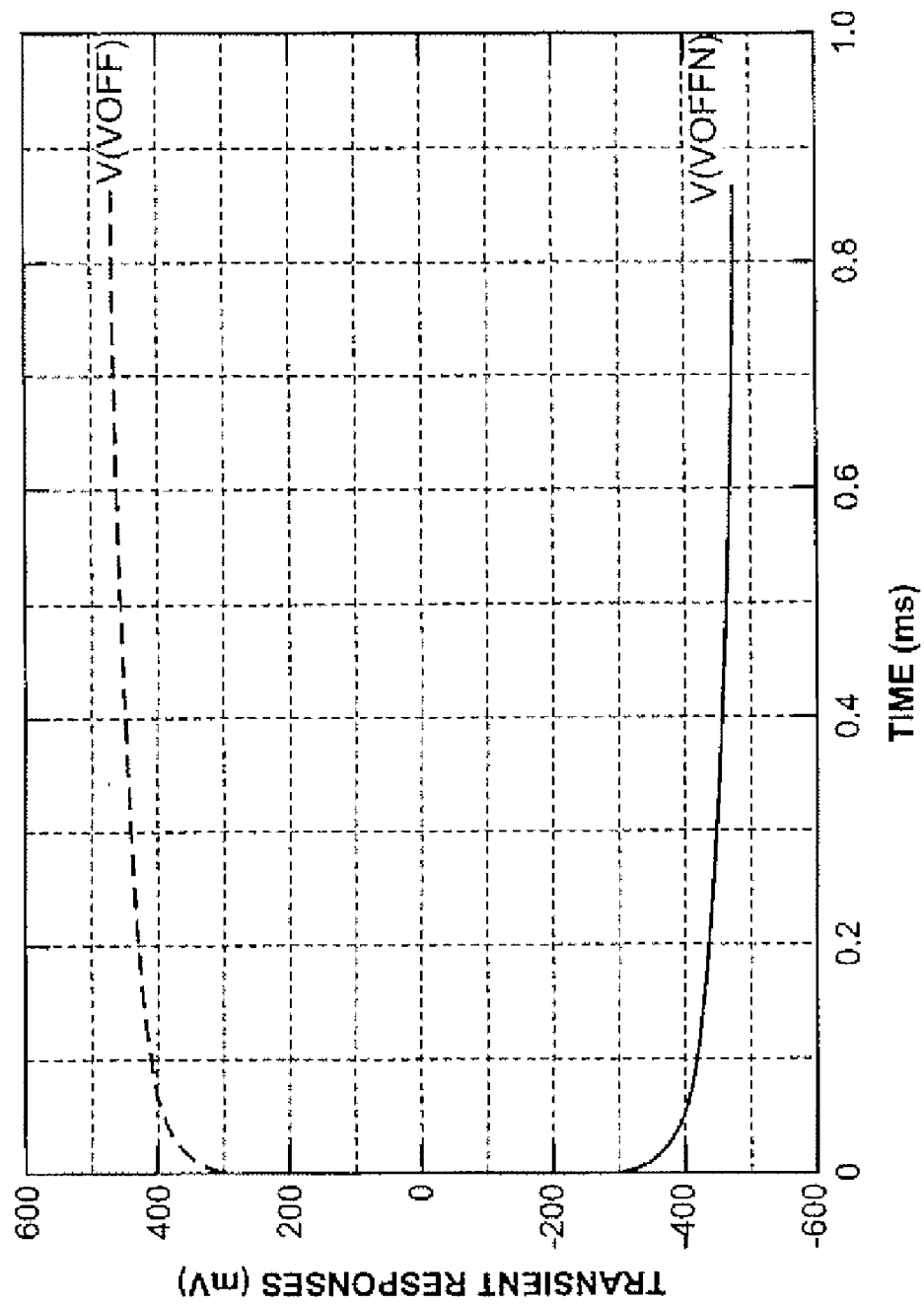
FIG. 24 is a plot of capacitor voltage versus time for the circuit of FIGS. 22A-22B.

FIG. 24 is a Voltage vs. Time plot generated by driving the circuit of FIGS. 22A and 22B to demonstrate the polarity of the voltages generated from the PMOS and NMOS current sources into capacitors C5 and C4, respectively, (which correspond to nodes VOFF and VOFFN, respectively, of FIG. 22A)

Figure 25:
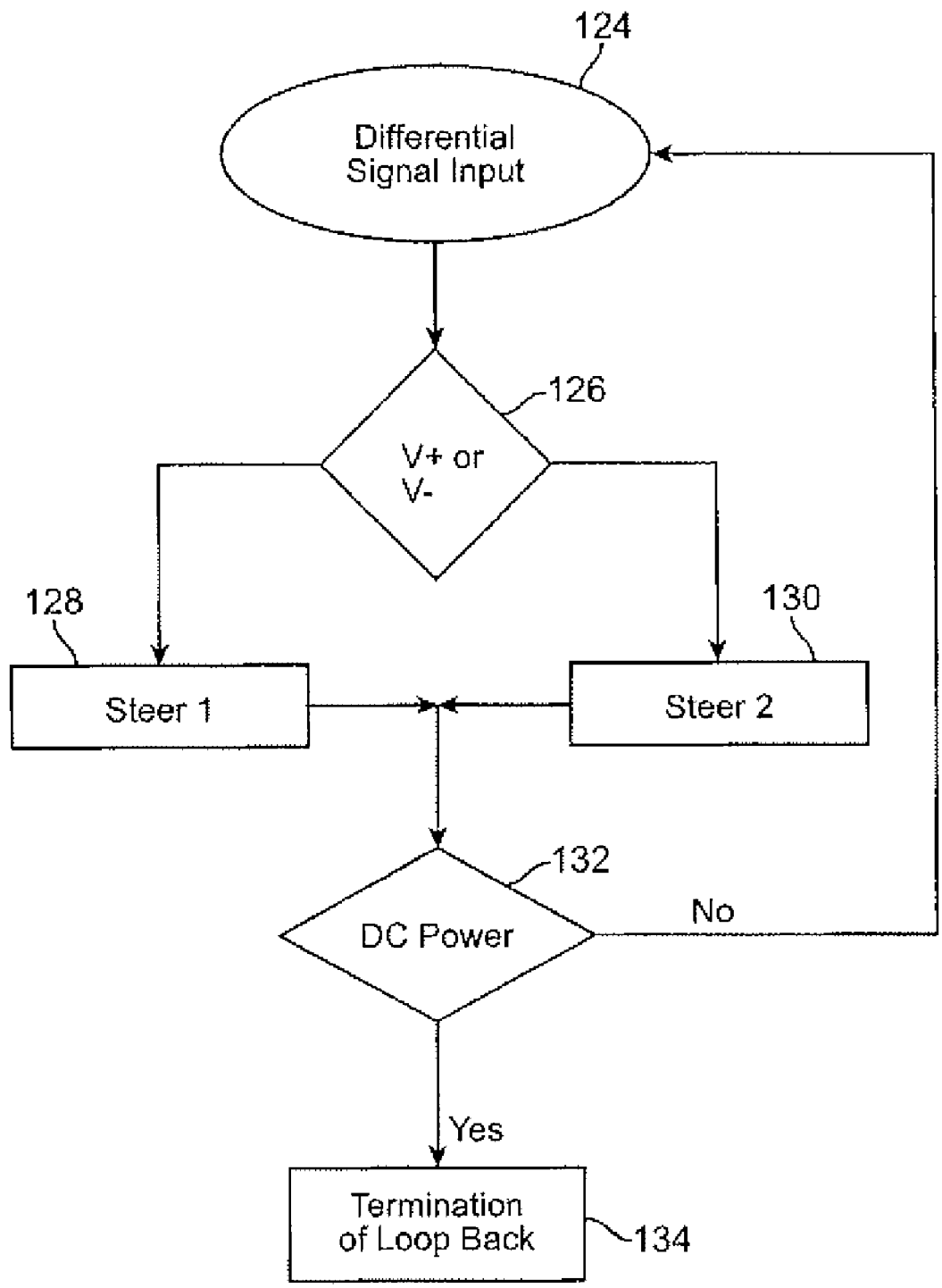
FIGS. 25-26 are flow diagrams for processes in accordance with specific embodiments of the present invention.
Figure 26:
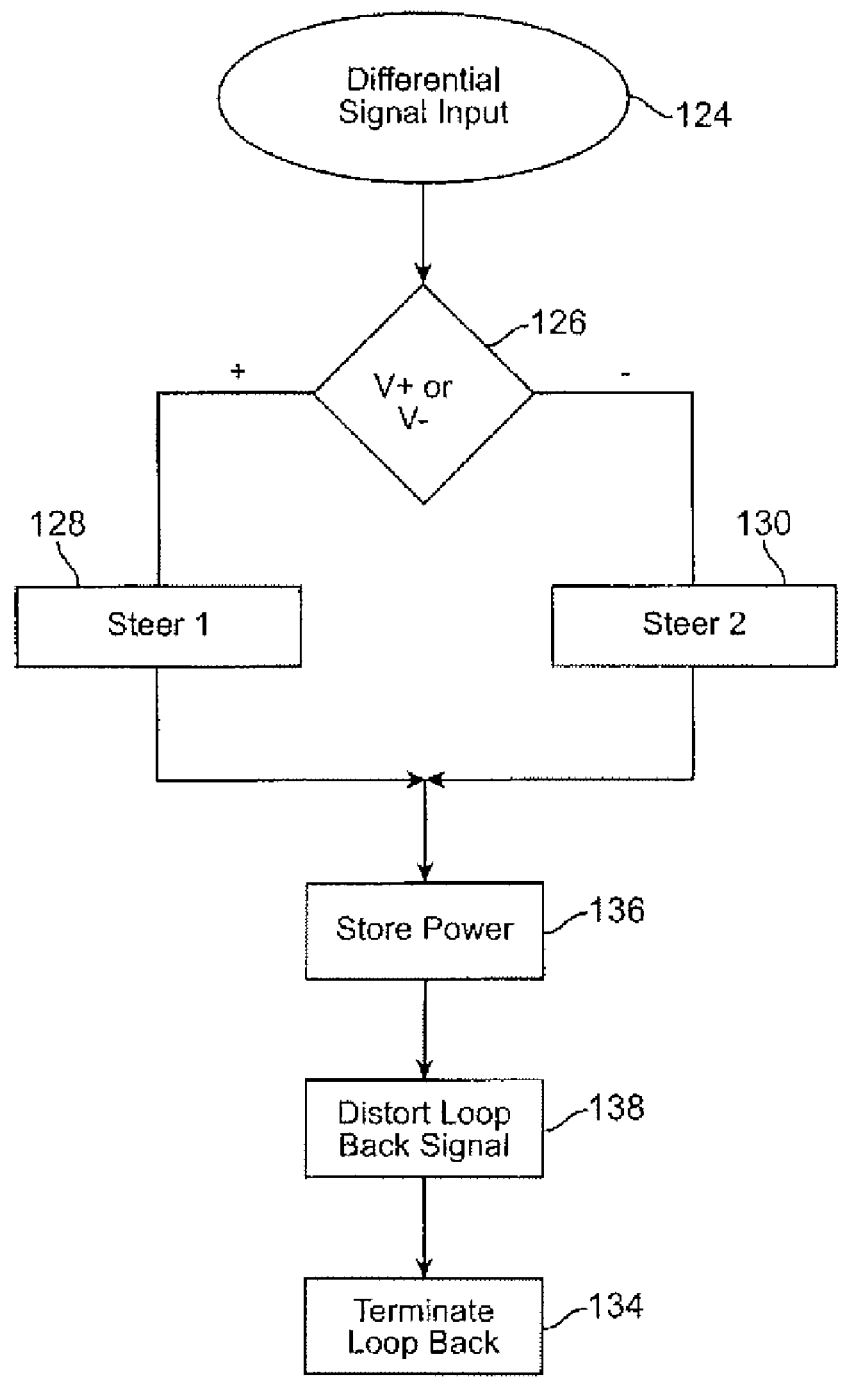

Turning now to FIGS. 25 and 26 flow charts illustrating methods in accordance with specific embodiments of the present invention are shown. The flow chart of FIG. 25 corresponds to the basic circuits of FIG. 3 and FIG. 16. A differential signal RX+, RX−) is input to the circuit at block 124. At block 126 it is decided whether steering circuit 1 or steering circuit 2 will handle the signal. Steering circuit 1 (block 128) or steering circuit 2 (block 130) handles the signal as described above. If DC power is applied (PWRUP) at block 132 then the loop back terminates (block 134), otherwise signal processing continues at block 124. In the version of the flow chart shown in FIG. 26, instead of block 132, block 136 acts to store power from the input signal by mirroring current into a voltage storage device such as a capacitor which is then used to power switches which force a distortion of the looped back signal (block 138) so that it will not propagate through a transformer or on a twisted pair transmission line. The distortions can shift the phase and or voltage centers of the signals so that they are no longer differential node signals.

Thus, a number of ways have been shown to block undesired loop back of packet traffic. Application of the phantom power signal can be used to disrupt the loop back circuitry stopping the loop back; switches can be turned on by powering their bases/gates by rectified signal current stored in capacitors (resistors to ground provided to discharge the capacitors so that they can reset when a DTE device is disconnected), data can be distorted through voltage and/or phase shifting so that it will not propagate through the transformer or on the twisted pair transmission line. It should also be noted that the transformer winding used to provide RX+, RX− to the PHY need not be the same as that used to drive the circuitry described above so as to avoid affecting the operation of the PHY.

While embodiments and applications of the invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. An electronic circuit for receiving a differential mode signal on a first pair of conductors and transmitting a signal on a second pair of conductors, the circuit comprising:
a first steering circuit responsive to the differential mode signal on the first pair of conductors and configured to generate a first electrical signal on one of the second pair of conductors;
a second steering circuit responsive to the differential mode signal on the first pair of conductors and configured to generate a second electrical signal on the other of the second pair of conductors, the first and second electrical signals together constituting a loop back of the differential mode signal and wherein the first steering circuit and the second steering circuit are respectively combined to generate the first electrical signal and the second electrical signal using a signal level power of the received differential mode signal; and
circuitry responsive to application of the DC voltage level and configured to disable the second steering circuit.

2. The electronic circuit of claim 1, wherein, when the first steering circuit is responsive to the differential mode signal on the first pair of conductors, the first steering circuit is responsive to a sinusoidal AC signal on the first pair of conductors and when the second steering circuit is responsive to the differential mode signal on the first pair of conductors, the second steering circuit is responsive to the sinusoidal AC signal on the first pair of conductors.

3. The electronic circuit of claim 1, comprising first circuitry responsive to application of a DC voltage level, the first circuitry configured to disable the first steering circuit.

4. The electronic circuit of claim 3, further comprising second circuitry responsive to application of the DC voltage level, the second circuitry configured to disable the second steering circuit.

5. A method for controlling the loop back of a differential mode signal received at a network device on a first pair of conductors and transmitted from the network device on a second pair of conductors, the method comprising:
receiving the differential mode signal;
applying the differential mode signal to a first steering circuit and a second steering circuit;
generating a first electrical signal to be transmitted on a first one of the second pair of conductors with the first steering circuit; and
generating a second electrical signal to be transmitted on a second one of the second pair of conductors with the second steering circuit,
the first and second electrical signals together constituting a loop back of the differential mode signal, the first electrical signal and the second electrical signal being generated using a signal level power of the received differential mode signal.

6. The method of claim 5, wherein receiving the differential mode signal comprises receiving a sinusoidal AC signal on a first pair of conductors, the first steering current and the second steering circuit responsive to the sinusoidal AC signal on the first pair of conductors.

7. The method of claim 5, comprising:
receiving, by a first circuitry portion, a DC voltage level; and
in response to receiving the DC voltage level, disabling the first steering circuit.

8. The method of claim 7, comprising:
receiving, by a second circuitry portion, a DC voltage level; and
in response to receiving the DC voltage level, disabling the second steering circuit.

9. A method for controlling the loop back of a differential mode signal received at a network device on a first pair of conductors and transmitted from the network device on a second pair of conductors, the method comprising:
receiving the differential mode signal;
applying the differential mode signal to a first steering circuit and a second steering circuit;
generating a first signal to be transmitted on a first one of the second pair of conductors with the first steering circuit;
generating a second signal to be transmitted on a second one of the second pair of conductors with the second steering circuit; and
transmitting the first and second signals on the second pair of conductors.

10. An apparatus for controlling the loop back of a differential mode signal received at a network device on a first pair of conductors and transmitted from the network device on a second pair of conductors, the apparatus comprising:
means for receiving the differential mode signal;
means for applying the differential mode signal to a first steering circuit and a second steering circuit;
means for generating a first electrical signal to be transmitted on a first one of the second pair of conductors with the first steering circuit; and
means for generating a second electrical signal to be transmitted on a second one of the second pair of conductors with the second steering circuit,
the first and second electrical signal together constituting a loop back of the differential mode signal, the first electrical signal and the second electrical signal generated using a signal level power of the received differential mode signal.

11. The apparatus of claim 10, wherein means for receiving the differential mode signal comprises means for receiving a sinusoidal AC signal on a first pair of conductors, the first steering current and the second steering circuit responsive to the sinusoidal AC signal on the first pair of conductors.

12. The apparatus of claim 10, comprising:
means for receiving a DC voltage level; and
means for disabling the first steering circuit in response to receiving the DC voltage level.

13. The apparatus of claim 10, comprising:
means for receiving a DC voltage level; and
means for disabling the second steering circuit in response to receiving the DC voltage level.

14. An apparatus for controlling the loop back of a differential mode signal received at a network device on a first pair of conductors and transmitted from the network device on a second pair of conductors, the apparatus comprising:
means for receiving the differential mode signal;
means for applying the differential mode signal to a first steering circuit and a second steering circuit;
means for generating a first signal to be transmitted on a first one of the second pair of conductors with the first steering circuit;
means for generating a second signal to be transmitted on a second one of the second pair of conductors with the second steering circuit, the first electrical signal and the second electrical signal generated using a signal level power of the received differential mode signal; and
means for transmitting the first and second signals on the second pair of conductors.

15. A system including a voice over IP telephone switch and at least one voice over IP telephone, the telephone including an apparatus for controlling the loop back of a differential mode signal received at the telephone on a first pair of conductors and transmitted from the telephone on a second pair of conductors, the apparatus comprising:
means for receiving the differential mode signal;
means for applying the differential mode signal to a first steering circuit and a second steering circuit;
means for generating a first electrical signal to be transmitted on a first one of the second pair of conductors with the first steering circuit; and
means for generating a second electrical signal to be transmitted on a second one of the second pair of conductors with the second steering circuit, the first and second electrical signal together constituting a loop back of the differential mode signal, the first electrical signal and the second electrical signal generated using a signal level power of the received differential mode signal.

16. A system including a voice over IP telephone switch and at least one voice over IP telephone, the telephone including an apparatus for controlling the loop back of a differential mode signal received at the telephone on a first pair of conductors and transmitted from the telephone on a second pair of conductors, the apparatus comprising:
means for receiving the differential mode signal;
means for applying the differential mode signal to a first steering circuit and a second steering circuit;

means for generating a first signal to be transmitted on a first one of the second pair of conductors with the first steering circuit;

means for generating a second signal to be transmitted on a second one of the second pair of conductors with the second steering circuit, the first electrical signal and the second electrical signal generated using a signal level power of the received differential mode signal; and means for transmitting the first and second signals on the second pair of conductors.

17. The system of claim 16, wherein means for receiving the differential mode signal comprises means for receiving a sinusoidal AC signal on a first pair of conductors, the first steering current and the second steering circuit responsive to the sinusoidal AC signal on the first pair of conductors.

18. The system of claim 16, comprising:
means for receiving a DC voltage level; and
means for disabling the first steering circuit in response to receiving the DC voltage level.

19. The system of claim 16, comprising:
means for receiving a DC voltage level; and
means for disabling the second steering circuit in response to receiving the DC voltage level.

20. A system including a voice over IP telephone switch and at least one voice over IP telephone, the voice over IP telephone device for receiving a differential mode signal on a first pair of conductors and transmitting a loop back signal on a second pair of conductors, the device comprising:

a first steering circuit responsive to the differential mode signal on the first pair of conductors and configured to generate a first electrical signal on one of the second pair of conductors; and a second steering circuit responsive to the differential mode signal on the first pair of conductors and configured to generate a second electrical signal on the other of the second pair of conductors, the first and second electrical signals together constituting a loop back of the differential mode signal, the first electrical signal and the second electrical signal generated using a signal level power of the received differential mode signal.

* * * * *